(12) United States Patent
Miyake et al.

(10) Patent No.: US 7,875,392 B2
(45) Date of Patent: Jan. 25, 2011

(54) POLYMER ELECTROLYTE MEMBRANE HAVING HIGH DURABILITY AND METHOD FOR PRODUCING THE SAME

(75) Inventors: Naoto Miyake, Kamakura (JP); Masanobu Wakizoe, Tokyo (JP); Eiji Honda, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 1526 days.

(21) Appl. No.: 10/874,246

(22) Filed: Jun. 24, 2004

(65) Prior Publication Data

US 2005/0053822 A1 Mar. 10, 2005

(30) Foreign Application Priority Data

Jun. 27, 2003 (JP) ............................. 2003-184226
Sep. 18, 2003 (JP) ............................. 2003-326230

(51) Int. Cl.
*H01M 6/18* (2006.01)
*H01M 8/10* (2006.01)

(52) U.S. Cl. ..................... 429/309; 429/492; 429/306; 429/491

(58) Field of Classification Search ............... 429/12–46
See application file for complete search history.

(56) References Cited

U.S. PATENT DOCUMENTS

| | | | |
|---|---|---|---|
| 4,218,542 A | | 8/1980 | Ukihashi et al. |
| 5,149,744 A | * | 9/1992 | Tarancon ................ 525/356 |
| 5,281,680 A | * | 1/1994 | Grot ....................... 526/243 |
| 5,523,181 A | | 6/1996 | Watanabe et al. |
| 5,525,436 A | | 6/1996 | Savinell et al. |
| 5,547,551 A | | 8/1996 | Bahar et al. |
| 5,599,614 A | | 2/1997 | Bahar et al. |
| 5,688,614 A | * | 11/1997 | Li et al. ................... 429/310 |
| 6,165,645 A | * | 12/2000 | Nishimura et al. ........ 429/303 |
| 6,300,381 B1 | | 10/2001 | Kerres et al. |
| 6,565,763 B1 | * | 5/2003 | Asakawa et al. .......... 216/56 |
| 6,632,847 B1 | | 10/2003 | Soczka-Guth et al. |
| 6,723,757 B1 | | 4/2004 | Kerres et al. |
| 2002/0127454 A1 | * | 9/2002 | Narang et al. ............ 429/33 |
| 2002/0136948 A1 | * | 9/2002 | Missling et al. .......... 429/212 |

FOREIGN PATENT DOCUMENTS

| | | | |
|---|---|---|---|
| EP | 0 094 679 A2 | | 11/1983 |
| JP | 6-111827 | | 4/1994 |
| JP | 9-219206 | | 8/1997 |
| JP | 2000048639 A | * | 2/2000 |
| JP | 3307891 | | 7/2000 |
| JP | 2002317058 A | * | 10/2002 |
| KR | 2003-0032321 | | 4/2003 |
| WO | WO 0054351 A1 | * | 9/2000 |
| WO | WO 03004463 A1 | * | 1/2003 |

OTHER PUBLICATIONS

"aryl." Merriam-Webster Online Dictionary. 2009. Merriam-Webster Online. Apr. 7, 2009. <http://www.merriam-webster.com/dictionary/aryl>.*
"Polyimide". Retrieved on Jul. 26, 2009 from eFunda.com. Web site: http://www.efunda.com/materials/polymers/properties/polymer_datasheet.cfm?MajorID=PI&MinorID=1.*
Utracki et al., "Multiphase Polymers: Blends and Ionomers", ACS Symposium Series No. 395, American Chemical Society, Washington, DC 1989, pp. 401-417.

* cited by examiner

*Primary Examiner*—Dah-Wei D Yuan
*Assistant Examiner*—Edu E Enin-Okut
(74) *Attorney, Agent, or Firm*—Staas & Halsey LLP

(57) ABSTRACT

A polymer electrolyte membrane comprising: (a) a fluorinated polymer electrolyte having an ion exchange group, and (b) a basic polymer, wherein, optionally, at least a part of component (a) and at least a part of component (b) are chemically bonded to each other. A method for producing the above-mentioned polymer electrolyte membrane. A membrane/electrode assembly comprising the above-mentioned polymer electrolyte membrane which is securely sandwiched between an anode and a cathode. A polymer electrolyte fuel cell comprising the membrane/electrode assembly.

15 Claims, 9 Drawing Sheets

500 μm

500 μm

POLYMER ELECTROLYTE MEMBRANE HAVING HIGH DURABILITY AND METHOD FOR PRODUCING THE SAME

BACKGROUND OF THE INVENTION

1. Field of the Invention

The present invention relates to a polymer electrolyte membrane for use in a polymer electrolyte fuel cell. More particularly, the present invention is concerned with a polymer electrolyte membrane comprising (a) a fluorinated polymer electrolyte having an ion exchange group, and (b) a basic polymer, wherein, optionally, at least a part of component (a) and at least a part of component (b) are chemically bonded to each other. The polymer electrolyte membrane of the present invention has excellent properties with respect to chemical stability, mechanical strength and heat stability, and exhibits high durability even when used at high temperatures. A polymer electrolyte fuel cell employing the polymer electrolyte membrane of the present invention is advantageous in that, even when the polymer electrolyte fuel cell is operated for a long time under high temperature/low humidity conditions (corresponding to an operating temperature around 100° C. and a humidification with 60° C. water (wherein the humidification with 60° C. water corresponds to a relative humidity (RH) of 20%)), the polymer electrolyte membrane will not suffer a breakage (such as the occurrence of a pinhole) and, therefore, a cross-leak (i.e., mixing of a fuel and an oxidant due to a breakage of a polymer electrolyte membrane) will not occur, thereby enabling the fuel cell to be operated stably for a long time under stringent conditions. The present invention is also concerned with a method for producing the above-mentioned polymer electrolyte membrane. The present invention is further concerned with a membrane/electrode assembly comprising the above-mentioned polymer electrolyte membrane which is securely sandwiched between an anode and a cathode, and concerned with a polymer electrolyte fuel cell comprising the membrane/electrode assembly.

2. Prior Art

Fuel cells generate electric energy by an electro-chemical reaction between a fuel (hydrogen source) and an oxidant (oxygen). That is, the chemical energy of the fuel is directly converted into an electric energy. As fuel sources, there can be used pure hydrogen and compounds containing hydrogen, such as petroleum, natural gases (such as methane) and methanol.

Fuel cells have the following advantageous characteristics. A fuel cell itself employs no mechanical parts and, therefore, it generates little noise. Further, in principle, a fuel cell can continue to generate electricity semipermanently by continuing to supply externally a fuel and an oxidant to the cell.

Electrolytes can be classified into a liquid electrolyte and a solid electrolyte. A fuel cell which employs a polymer electrolyte membrane as an electrolyte is called a "polymer electrolyte fuel cell".

The polymer electrolyte fuel cells are able to operate at low temperatures, as compared to the operating temperatures of other types of fuel cells. Therefore, the polymer electrolyte fuel cells are attracting attention as promising candidates for an alternative power source of an automobile and the like, a household cogeneration system and a portable electric power generator.

A polymer electrolyte fuel cell comprises a membrane/electrode assembly comprised of a proton exchange membrane which is securely sandwiched between gas diffusion electrodes, wherein each gas diffusion electrode is a laminate comprising an electrode catalyst layer and a gas diffusion layer. The proton exchange membrane mentioned herein is a material which has strongly acidic groups (e.g., a sulfonic acid group and a carboxylic acid group) in a polymer chain thereof and allows selective permeation of protons. Examples of proton exchange membranes include perfluorinated proton exchange membranes, such as Nafion (trade name; manufactured and sold by E.I. duPont de Nemours & Company Inc., U.S.A) having high chemical stability.

For the operation of a fuel cell, a fuel (e.g., hydrogen) and an oxidant (e.g., oxygen or air) are, respectively, supplied to anodic and cathodic gas diffusion electrodes, and the two electrodes are connected to each other through an external circuit. Specifically, when hydrogen is used as a fuel, hydrogen is oxidized on the anodic catalyst to thereby generate protons, and the generated protons pass through a proton-conductive polymer in the anodic catalyst layer. Then the protons pass through the proton exchange membrane and then a proton-conductive polymer in the cathodic catalyst layer, thereby reaching the surface of the cathodic catalyst. On the other hand, electrons which are generated simultaneously with the generation of protons during the oxidation of hydrogen flow through the external circuit to thereby reach the cathodic gas diffusion electrode. On the cathodic catalyst of the cathodic gas diffusion electrode, the electrons react with both the above-mentioned protons and the oxygen in the oxidant to thereby generate water, and an electric energy is obtained by the reaction. During the operation of the fuel cell, the proton exchange membrane must function as a gas barrier. When the proton exchange membrane has high gas permeability, a leak of hydrogen from the anode side to the cathode side and a leak of oxygen from the cathode side to the anode side (namely a cross-leak) occur to cause a so-called chemical short circuiting, thus rendering it impossible to obtain a high voltage electricity.

The polymer electrolyte fuel cells are usually operated at around 80° C. so that the fuel cells can exhibit high output property. However, when a polymer electrolyte fuel cell is used in an automobile, from the viewpoint of the operation of the automobile in summer, it is desired that the fuel cell is able to operate under high temperature/low humidity conditions (corresponding to an operating temperature around 100° C. and a humidification with 60° C. water (wherein the humidification with 60° C. water corresponds to a relative humidity (RH) of 20%)). However, when a fuel cell employing a conventional perfluorinated proton exchange membrane is operated for a long time under high temperature/low humidity conditions, a problem occurs in that the proton-exchange membrane suffers the occurrence of a pinhole, thus causing a cross-leak. Therefore, the durability of the conventional proton exchange membrane is unsatisfactory.

As methods for improving the durability of the perfluorinated proton exchange membranes, there can be mentioned the following methods: a method in which a proton exchange membrane is reinforced by incorporation of polytetrafluoroethylene (PTFE) fibrils (see Unexamined Japanese Patent Application Laid-Open Specification No. Sho 53-149881 (corresponding to U.S. Pat. No. 4,218,542) and Examined Japanese Patent Application Publication No. Sho 63-61337 (corresponding to EP 94679 B); a method in which a proton exchange membrane is reinforced with a stretched porous PTFE membrane (see Examined Japanese Patent Application Publication No. Hei 5-75835 and Japanese Patent Application prior-to-examination Publication (Tokuhyo) No. Hei 11-501964 (corresponding to U.S. Pat. Nos. 5,599,614 and 5,547,551); and a method in which a proton exchange membrane is reinforced by incorporation of inorganic particles (such as $Al_2O_3$, $SiO_2$, $TiO_2$ and $ZrO_2$) (see Unexamined Japanese Patent Application Laid-Open Specification Nos. Hei 6-111827 and Hei 9-219206, and U.S. Pat. No. 5,523,181). (In the above-mentioned method in which a proton exchange membrane is reinforced using PTFE fibrils, PTFE fibrils are added to a raw material solution for producing a proton exchange membrane. In the above-mentioned method in which a proton exchange membrane is reinforced using a stretched porous PTFE membrane, a stretched porous PTFE membrane is adhered to a produced proton exchange membrane or, alternatively, a stretched porous PTFE membrane is impregnated with a raw material solution for producing a proton exchange membrane, followed by removal of the solvent from the solution to thereby produce a proton exchange membrane containing the porous PTFE membrane.) In addition, as methods for obtaining a perfluorinated proton exchange membrane having an improved heat resistance, there can be mentioned the following methods: a method in which a perfluorinated proton exchange membrane is subjected to crosslinking treatment to thereby form a crosslinkage through a strongly acidic crosslinking group (see Unexamined Japanese Patent Application Laid-Open Specification No. 2000-188013); and a method in which a sol-gel reaction is used to incorporate silica into a perfluorinated proton exchange membrane (see K. A. Mauritz, R. F. Storey and C. K. Jones, in Multiphase Polymer Materials: Blends and Ionomers, L. A. Utracki and R. A. Weiss, Editors, ACS Symposium Series No. 395, p. 401, American Chemical Society, Washington, D.C. (1989)). However, none of theses methods are able to solve the above-mentioned problem.

There is a report that a fuel cell using a proton exchange membrane comprising a material obtained by doping polybenzimidazole (having high heat resistance) with a strong acid (e.g., phosphoric acid) (hereinafter referred to as a "strong acid-doped membrane") can be operated at a high temperature which is not less than 100° C. (see Japanese Patent Application prior-to-examination Publication (Tokuhyo) No. Hei 11-503262 (corresponding to U.S. Pat. No. 5,525,436)). However, at an operating temperature below 100° C., liquid water is present in such fuel cell, and the doped strong acid moves from the membrane into the water, thus decreasing the output of the fuel cell. Therefore, such fuel cell is unsuitable for operation at a temperature below 100° C. For this reason, such fuel cell is difficult to use in automobiles, because a fuel cell used in an automobile is frequently switched on and off and is required to be able to operate at a temperature below 100° C.

Proton exchange membranes made of a polymer blend containing a polybenzimidazole are known. Representative examples of proton exchange membranes made of a polymer blend containing a polybenzimidazole include a proton exchange membrane produced from a polymer composition comprising a sulfonated aromatic polyether ketone and a polybenzimidazole (see Japanese Patent Application prior-to-examination Publication (Tokuhyo) No. 2002-529546 (corresponding to U.S. Pat. No. 6,632,847)); and a proton exchange membrane obtained by a method in which a hydrocarbon polymer having an ion exchange group and a basic polymer (such as a polybenzimidazole) are blended with each other in the presence of an aprotic solvent and, then, the resultant polymer blend is cast, followed by removal of the solvent, to obtain a proton exchange membrane (see Japanese Patent Application prior-to-examination Publication (Tokuhyo) Nos. 2002-512285 (corresponding to U.S. Pat. No. 6,300,381 B1) and 2002-512291 (corresponding to U.S. Pat. No. 6,723,757)). However, these polymer electrolyte membranes produced from a polymer blend comprising a hydrocarbon polymer and a polybenzimidazole exhibit only an unsatisfactory level of chemical stability and, therefore, these polymer electrolyte membranes are unable to solve the above-mentioned problem of the occurrence of a cross-leak.

On the other hand, Comparative Example 3 of KR 2003-32321 A discloses a polymer electrolyte membrane produced from a polymer blend comprising a polybenzimidazole (PBI) and Nafion. This polymer electrolyte membrane is produced as follows. A polybenzimidazole and Nafion are individually dissolved in dimethylacetoamide to thereby obtain two solutions. The obtained two solutions are mixed together, and the resultant mixture is cast, followed by removal of the solvent, thereby obtaining a solid polymer electrolyte membrane. However, by this method, PBI cannot be uniformly microdispersed in Nafion, and the produced polymer electrolyte membrane has a non-uniform dispersion of PBI and assumes a mottled appearance. In other words, the produced polymer electrolyte membrane has many portions containing only a small amount of PBI and, hence, cannot exhibit the desired effects of PBI. Specifically, such portions of the membrane exhibit only an unsatisfactory level of chemical stability which is substantially the same as the chemical stability of Nafion as such, and such portions of the membrane are causative of the occurrence of a cross-leak. Therefore, this polymer electrolyte membrane cannot exhibit a satisfactory level of durability for use in a fuel cell which is operated under high temperature/low humidity conditions.

As described hereinabove, a polymer electrolyte membrane having excellent properties with respect to chemical stability, mechanical strength and heat stability, and exhibiting high durability even when used at high temperatures, that is, a polymer electrolyte membrane suitable for practical use, has not been obtained in the prior art. Specifically, there is no conventional polymer electrolyte membrane which can be advantageously used for producing an excellent fuel cell which is advantageous not only in that the fuel cell is free from the occurrence of a cross-leak even when the fuel cell is operated for a long time under high temperature/low humidity conditions (corresponding to an operating temperature around 100° C. and a humidification with 60° C. water (wherein the humidification with 60° C. water corresponds to a relative humidity (RH) of 20%)), but also in that the fuel cell does not suffer a lowering of the output property even when the fuel cell is frequently switched on and off. Therefore, the development of a polymer electrolyte membrane having the above-mentioned excellent properties has been desired.

SUMMARY OF THE INVENTION

In this situation, the present inventors have made extensive and intensive studies with a view toward solving the above-mentioned problems of the prior art. As a result, it has unexpectedly been found that the above-mentioned problems can be solved by a polymer electrolyte membrane having a structure in which a basic polymer (b) is uniformly microdispersed in a fluorinated polymer electrolyte (a). Further, it has unexpectedly been found that the polymer electrolyte membrane having a structure in which a basic polymer (b) is uniformly microdispersed in a fluorinated polymer electrolyte (a) can be produced by a method which comprises: providing a casting liquid in which a liquid medium comprising a protic solvent is mixed with a polymer mixture of (a) a fluorinated polymer electrolyte having an ion exchange group, and (b) a basic polymer; casting the casting liquid onto a substrate to thereby form a liquid coating on the substrate; and removing the liquid medium from the liquid coating to thereby form a solid polymer electrolyte membrane. The thus obtained polymer electrolyte membrane has excellent properties with respect to chemical stability, mechanical strength and heat stability, and exhibits high durability even when used at high temperatures. By virtue of these excellent properties of the above-mentioned polymer electrolyte membrane, a polymer electrolyte fuel cell employing the polymer electrolyte membrane is advantageous in that, even when the polymer electrolyte fuel cell is operated for a long time under high temperature/low humidity conditions (corresponding to an operating temperature around 100° C. and a humidification with 60° C. water (wherein the humidification with 60° C. water corresponds to a relative humidity (RH) of 20%)), a cross-leak will not occur. In addition, it has been confirmed that the polymer electrolyte fuel cell employing the above-mentioned polymer electrolyte membrane does not suffer a lowering of the output property even when the fuel cell is frequently switched on and off, that is, the output property of the polymer electrolyte fuel cell has the same stability as that of a fuel cell employing a conventional perfluorinated proton exchange membrane. Based on these novel findings, the present invention has been completed.

Accordingly, it is an object of the present invention to provide a polymer electrolyte membrane which is extremely suitable for practical use, namely a polymer electrolyte membrane having excellent properties with respect to chemical stability, mechanical strength and heat stability, and exhibiting high durability even when used at high temperatures.

Another object of the present invention is to provide a method for producing the above-mentioned polymer electrolyte membrane.

Still another object of the present invention is to provide a membrane/electrode assembly comprising the above-mentioned polymer electrolyte membrane which is securely sandwiched between an anode and a cathode, and to provide a polymer electrolyte fuel cell comprising the membrane/electrode assembly.

The foregoing and other objects, features and advantages of the present invention will be apparent from the following detailed description taken in connection with the accompanying drawings, and the appended claims.

Figure 7:
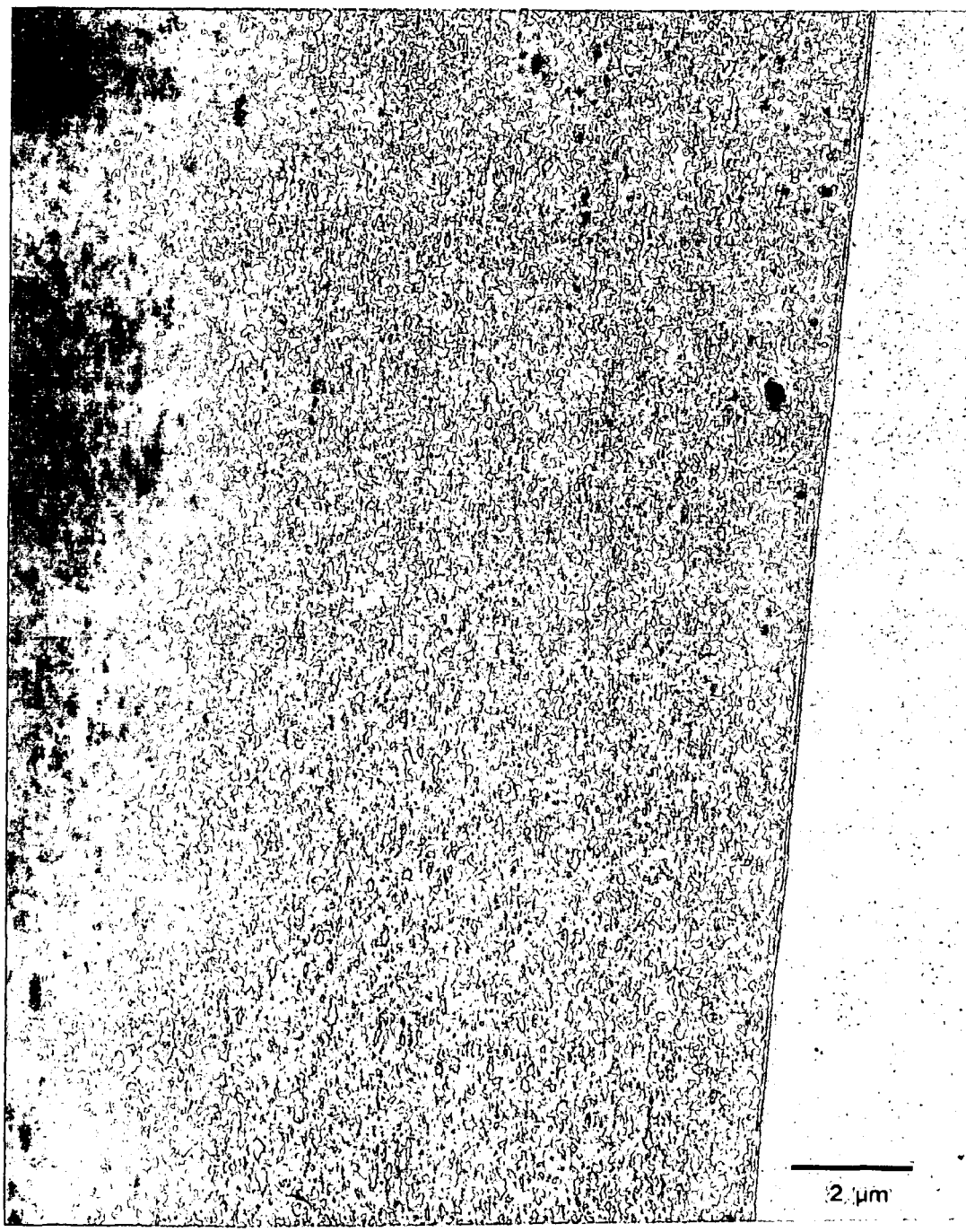
FIG. 7 is a TEM photomicrograph of a cross-section of the polymer electrolyte membrane produced in Example 5, which was taken in a thicknesswise direction thereof.

Among the TEM photomicrographs shown in the drawings, the TEM photomicrograph of FIG. 7 is positioned such that the horizontal direction of the photomicrograph corresponds to the thicknesswise direction of the membrane. In each of the other TEM photomicrographs shown in the drawings, the vertical direction of the photomicrograph corresponds to the thicknesswise direction of the membrane.

DETAILED DESCRIPTION OF THE INVENTION

In one aspect of the present invention, there is provided a polymer electrolyte membrane comprising:

(a) 50.000 to 99.999% by weight, based on the total weight of components (a) and (b), of a fluorinated polymer electrolyte having an ion exchange group, and (b) 0.001 to 50.000% by weight, based on the total weight of components (a) and (b), of a basic polymer, wherein, optionally, at least a part of component (a) and at least a part of component (b) are chemically bonded to each other.

In another aspect of the present invention, there is provided a method for producing a polymer electrolyte membrane, comprising:

providing a casting liquid in which a liquid medium comprising a protic solvent is mixed with a polymer mixture of:

(a) 50.000 to 99.999% by weight, based on the total weight of components (a) and (b), of a fluorinated polymer electrolyte having an ion exchange group, and (b) 0.001 to 50.000% by weight, based on the total weight of components (a) and (b), of a basic polymer, casting the casting liquid onto a substrate to thereby form a liquid coating on the substrate, and removing the liquid medium from the liquid coating to thereby form a solid polymer electrolyte membrane.

In still another aspect of the present invention, there is provided a membrane/electrode assembly comprising the polymer electrolyte membrane of the present invention which is securely sandwiched between an anode and a cathode, wherein the anode comprises an anodic catalyst layer and is proton-conductive, and the cathode comprises a cathodic catalyst layer and is proton-conductive.

In still another aspect of the present invention, there is provided a polymer electrolyte fuel cell comprising the above-mentioned membrane/electrode assembly, wherein the anode and the cathode are connected to each other through an electron conductive material which is positioned in the outside of the polymer electrolyte membrane.

For easy understanding of the present invention, the essential features and various preferred embodiments of the present invention are enumerated below.

1. A polymer electrolyte membrane comprising:
   (a) 50.000 to 99.999% by weight, based on the total weight of components (a) and (b), of a fluorinated polymer electrolyte having an ion exchange group, and
   (b) 0.001 to 50.000% by weight, based on the total weight of components (a) and (b), of a basic polymer,
   wherein, optionally, at least a part of component (a) and at least a part of component (b) are chemically bonded to each other.

2. The polymer electrolyte membrane according to item 1 above, wherein the amount of the basic polymer (b) is from 0.01 to 10.000% by weight, based on the total weight of components (a) and (b).

3. The polymer electrolyte membrane according to item 1 above, wherein the basic polymer (b) is a nitrogen-containing aromatic basic polymer.

4. The polymer electrolyte membrane according to any one of items 1 to 3 above, which exhibits a sea/islands structure when a cross-section of said membrane which is taken in a thicknesswise direction of the membrane is examined with respect to a 15 μm×15 μm area thereof by a transmission electron microscope.

5. The polymer electrolyte membrane according to any one of items 1 to 3 above, which has an ion exchange capacity of from 1.0 to 1.5 milliequivalents per gram of the membrane.

6. The polymer electrolyte membrane according to any one of items 1 to 3 above, wherein the fluorinated polymer electrolyte (a) is represented by the following formula:

$$[CF_2CF_2]_a\text{—}[CF_2\text{—}CF(\text{—}O\text{—}(CF_2\text{—}CF(CF_3))_b\text{—}O\text{—}(CF_2)_f\text{—}X^4)]_g$$

wherein $0 \leq a < 1$, $0 < g \leq 1$, $a+g=1$, $1 \leq b \leq 3$, $1 \leq f \leq 8$, and $X^4$ represents —COOH, —SO$_3$H, —PO$_3$H$_2$ or —PO$_3$H.

7. The polymer electrolyte membrane according to any one of items 1 to 3 above, wherein the fluorinated polymer electrolyte (a) is represented by the following formula:

$$[CF_2CF_2]_a\text{—}[CF_2\text{—}CF(\text{—}O\text{—}(CF_2)_f\text{—}X^4)]_g$$

wherein $0 \leq a < 1$, $0 < g \leq 1$, $a+g=1$, $1 \leq f \leq 8$, and $X^4$ represents —COOH, —SO$_3$H, —PO$_3$H$_2$ or —PO$_3$H.

8. The polymer electrolyte membrane according to item 3 above, wherein the nitrogen-containing aromatic basic polymer is poly[2,2'-(m-phenylene)-5,5'-bibenzimidazole].

9. The polymer electrolyte membrane according to any one of items 1 to 3 above, which has a thickness of from 2 to 150 μm.

10. The polymer electrolyte membrane according to any one of items 1 to 3 above, which exhibits a haze value of 25% or less as measured in accordance with JIS K 7136, when it has a thickness of 50 μm.

11. The polymer electrolyte membrane according to any one of items 1 to 3 above, which has a thickness other than 50 μm and exhibits a calculated haze value (H$_{50}$) of 25% or less, wherein the calculated haze value (H$_{50}$) is defined as a haze value calculated on the assumption that the polymer electrolyte membrane has a thickness of 50 μm, the calculated haze value (H$_{50}$) being obtained by the following formula:

$$H_{50} = 100 \cdot \left\{ 1 - \left( \frac{100 - H_t}{100} \right)^{\frac{50}{t}} \right\}$$

wherein t represents the thickness (μm) of the polymer electrolyte membrane, and H$_t$ represents the haze value of the polymer electrolyte membrane, as measured in accordance with JIS K 7136.

12. The polymer electrolyte membrane according to item 4 above, wherein the ratio of the island particles in the sea/islands structure is from 0.1 to 70%, in terms of the percentage of the total area of the island particles in the 15 μm×15 μm area of the cross-section of the membrane.

13. The polymer electrolyte membrane according to item 4 or 12 above, wherein the density of the island particles in the sea/islands structure is from 0.1 to 100 island particles/μm$^2$ in the 15 μm×15 μm area of the cross-section of the membrane.

14. The polymer electrolyte membrane according to any one of items 1 to 3 above, which has at least one reinforcement selected from the group consisting of a reinforcement contained in the membrane and a reinforcement secured to a surface of the membrane.

15. A method for producing a polymer electrolyte membrane, comprising:
   providing a casting liquid in which a liquid medium comprising a protic solvent is mixed with a polymer mixture of:
   (a) 50.000 to 99.999% by weight, based on the total weight of components (a) and (b), of a fluorinated polymer electrolyte having an ion exchange group, and
   (b) 0.001 to 50.000% by weight, based on the total weight of components (a) and (b), of a basic polymer,
   casting the casting liquid onto a substrate to thereby form a liquid coating on the substrate, and
   removing the liquid medium from the liquid coating to thereby form a solid polymer electrolyte membrane.

16. The method according to item 15 above, which further comprises subjecting the formed polymer electrolyte membrane to heat treatment.

17. The method according to item 15 above, wherein the liquid medium further comprises an aprotic solvent, and the amount of the protic solvent is 0.5 to 99.5% by weight, and the amount of the aprotic solvent is 99.5 to 0.5% by weight, each based on the total weight of the protic solvent and the aprotic solvent.

18. The method according to item 15 above, wherein the protic solvent is water.

19. A polymer electrolyte membrane obtained by the method of any one of items 15 to 18 above.

20. A membrane/electrode assembly comprising the polymer electrolyte membrane of any one of items 1 to 3 above, which is securely sandwiched between an anode and a cathode, wherein the anode comprises an anodic catalyst layer and is proton-conductive, and the cathode comprises a cathodic catalyst layer and is proton-conductive.

21. A membrane/electrode assembly comprising the polymer electrolyte membrane of item 19 above, which is securely sandwiched between an anode and a cathode, wherein the anode comprises an anodic catalyst layer and is proton-conductive, and the cathode comprises a cathodic catalyst layer and is proton-conductive.

22. A polymer electrolyte fuel cell comprising the membrane/electrode assembly of item 20 above, wherein the anode and the cathode are connected to each other through an electron conductive material which is positioned in the outside of the polymer electrolyte membrane.

23. A polymer electrolyte fuel cell comprising the membrane/electrode assembly of item 21 above, wherein the anode and the cathode are connected to each other through an electron conductive material which is positioned in the outside of the polymer electrolyte membrane.

Hereinbelow, the present invention is explained in detail.

(The Polymer Electrolyte Membrane of the Present Invention)

The polymer electrolyte membrane of the present invention comprises (a) 50.000 to 99.999% by weight, based on the total weight of components (a) and (b), of a fluorinated polymer electrolyte having an ion exchange group, and (b) 0.001 to 50.000% by weight, based on the total weight of components (a) and (b), of a basic polymer, wherein, optionally, at least a part of component (a) and at least a part of component (b) are chemically bonded to each other.

There is no particular limitation with respect to the fluorinated polymer electrolyte (a) used in the present invention. Representative examples of fluorinated polymer electrolytes include Nafion (trade name; manufactured and sold by E.I. duPont de Nemours & Company Inc., U.S.A.), Aciplex (trade name; manufactured and sold by Asahi Kasei Corporation, Japan) and Flemion (trade name; manufactured and sold by Asahi Glass Co., Ltd., Japan). These fluorinated polymer electrolytes are perfluorocarbon polymers having an ion exchange group, which are represented by the following formula (1):

$$[CF_2CX^1X^2]_a\text{—}[CF_2\text{—}CF(\text{—}O\text{—}(CF_2\text{—}CF(CF_2X^3))_b\text{—}O_c\text{—}(CFR^1)_d\text{—}(CFR^2)_e\text{—}(CF_2)_f\text{—}X^4)]_g \quad (1)$$

wherein,
each of $X^1$, $X^2$ and $X^3$ independently represents a halogen atom or a $C_1$-$C_3$ perfluoroalkyl group;
$0 \leq a < 1$, $0 < g \leq 1$, $a+g=1$ and $0 \leq b \leq 8$;
c is 0 or 1;
each of d, e and f is independently a number in the range of from 0 to 6, provided that d+e+f is not 0;
each of $R^1$ and $R^2$ independently represents a halogen atom, a $C_1$-$C_{10}$ perfluoroalkyl group or a $C_1$-$C_{10}$ fluorochloroalkyl group; and
$X^4$ represents —COOZ, —SO$_3$Z, —PO$_3$Z$_2$ or —PO$_3$HZ, wherein Z represents a hydrogen atom, a metal atom (such as Na, K or Ca) or an amine (NH$_4$, NH$_3$R$^1$, NH$_2$R$^2$, NHR$^3$ or NR$^4$ (wherein each of R$^1$ to R$^4$ independently represents an alkyl group or an arene group)).

Among the compounds represented by formula (1) above, especially preferred are the compounds represented by the following formula (2) or (3):

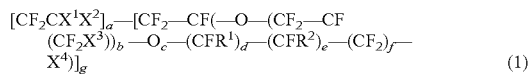

wherein $0 \leq a < 1$, $0 < g \leq 1$, a+g=1, $1 \leq b \leq 3$, $1 \leq f \leq 8$, and $X^4$ represents —COOH, —SO$_3$H, —PO$_3$H$_2$ or —PO$_3$H; and $$[CF_2CF_2]_a\text{—}[CF_2\text{—}CF(\text{—}O\text{—}(CF_2)_f\text{—}X^4)]_g \quad (3)$$

wherein $0 \leq a < 1$, $0 < g \leq 1$, a+g=1, $1 \leq f \leq 8$, and $X^4$ represents —COOH, —SO$_3$H, —PO$_3$H$_2$ or —PO$_3$H.

The perfluorocarbon polymers, such as those mentioned above, may be copolymers containing a comonomer unit obtained from comonomers, such as perfluoroolefins (such as hexafluoropropylene and chlorotrifluoroethylene), and perfluoroalkyl vinyl ethers.

Methods for producing the fluorinated polymer electrolyte (a) used in the present invention are described in, for example, U.S. Pat. No. 5,281,680, Unexamined Japanese Patent Application Laid-Open Specification No. Hei 7-252322 and U.S. Pat. No. 5,608,022.

The amount of the fluorinated polymer electrolyte (a) in the polymer electrolyte membrane of the present invention is in the range of from 50.000 to 99.999% by weight, preferably from 80.000 to 99.995% by weight, more preferably from 90.000 to 99.990% by weight, still more preferably from 95.000 to 99.900% by weight, most preferably from 98.000 to 99.900% by weight, based on the total weight of components (a) and (b). When the amount of the fluorinated polymer electrolyte (a) is in the above-mentioned range (i.e., 50.000 to 99.999% by weight), there can be obtained a polymer electrolyte membrane having-high durability while maintaining excellent proton conductivity.

With respect to the basic polymer (b) used in the polymer electrolyte membrane of the present invention, there is no particular limitation. As examples of basic polymers (b), there can be mentioned a nitrogen-containing aliphatic basic polymer and a nitrogen-containing aromatic basic polymer.

Specific examples of nitrogen-containing aliphatic basic polymers include polyethylene imines. Specific examples of nitrogen-containing aromatic basic polymers include polyanilines and heterocyclic compounds, such as a polybenzimidazole, a polypyridine, a polypyrimidine, a polyvinylpyridine, a polyimidazole, a polypyrrolidine and a polyvinylimidazole. Among these, a polybenzimidazole, which has high heat stability, is especially preferred.

Specific examples of polybenzimidazoles include compounds represented by formula (4) below, compounds represented by formula (5) below, and a poly(2,5-benzimidazole) represented by formula (6) below.

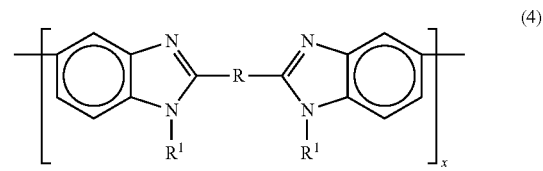

(4)

wherein:
each R independently represents a divalent group, such as an alkane chain, a fluoroalkane chain or any one of the following structures:

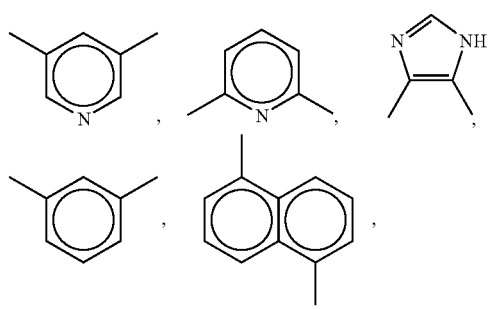

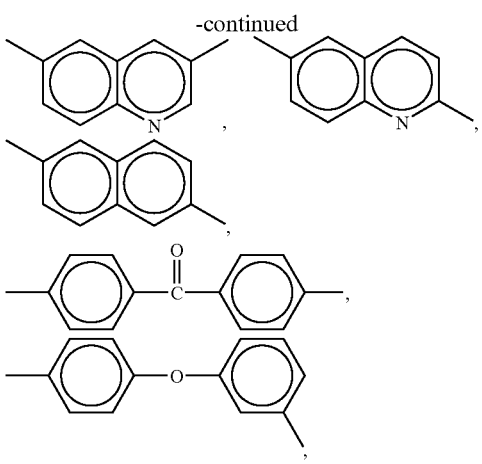

each $R^1$ independently represents a hydrogen atom, an alkyl group, a phenyl group or a pyridyl group; and x is a number in the range of from 10 to $1.0 \times 10^7$.

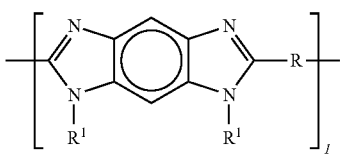

(5)

wherein R and $R^1$ are as defined for formula (4), and l is a number in the range of from 10 to $1.0 \times 10^7$.

(6)

wherein $R^1$ is as defined for formula (4), and m is a number in the range of from 10 to $1.0 \times 10^7$.

Among the above-mentioned polybenzimidazoles, especially preferred is poly[(2,2'-(m-phenylene)-5,5'-bibenzimidazole] represented by the following formula (7):

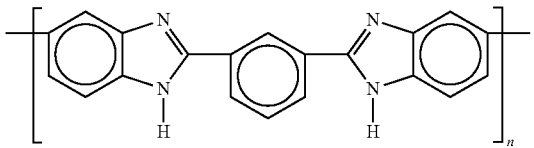

(7)

wherein n is a number in the range of from 10 to $1.0 \times 10^7$.

The amount of the basic polymer (b) in the polymer electrolyte membrane of the present invention is in the range of from 0.001 to 50.000% by weight, preferably from 0.005 to 20.000% by weight, more preferably from 0.010 to 10.000% by weight, still more preferably from 0.100 to 5.000% by weight, most preferably from 0.100 to 2.000% by weight, based on the total weight of components (a) and (b). When the amount of the basic polymer (b) is in the above-mentioned range (i.e., 0.001 to 50.000% by weight), there can be obtained a polymer electrolyte membrane having high durability while maintaining excellent proton conductivity.

In the polymer electrolyte membrane of the present invention, it is preferred that the polymer electrolyte membrane exhibits a sea/islands structure when a cross-section of the membrane which is taken in a thickness-wise direction of the membrane is examined with respect to a 15 µm×15 µm area thereof by a transmission electron microscope (hereinafter referred to as "TEM"). The term "sea/islands structure" used herein means a structure in which black island particles are dispersed in a white or gray sea (continuous phase), wherein the structure can be observed when a cross-section of the membrane which is not stained is examined through an electron microscope. With respect to the shape of the island particles, there is no particular limitation, and the island particles may have the shape of a circle, an oval or a polygon, or may have an indefinite shape. The diameter (in terms of the length of the major axis or maximum axis) of each of the island particles is in the range of from 0.01 to 10 µm. In the sea/islands structure, the black island particles are composed mainly of the basic polymer (b), and the white (or gray) sea (continuous phase) is composed mainly of the fluorinated polymer electrolyte (a).

Figure 6A:
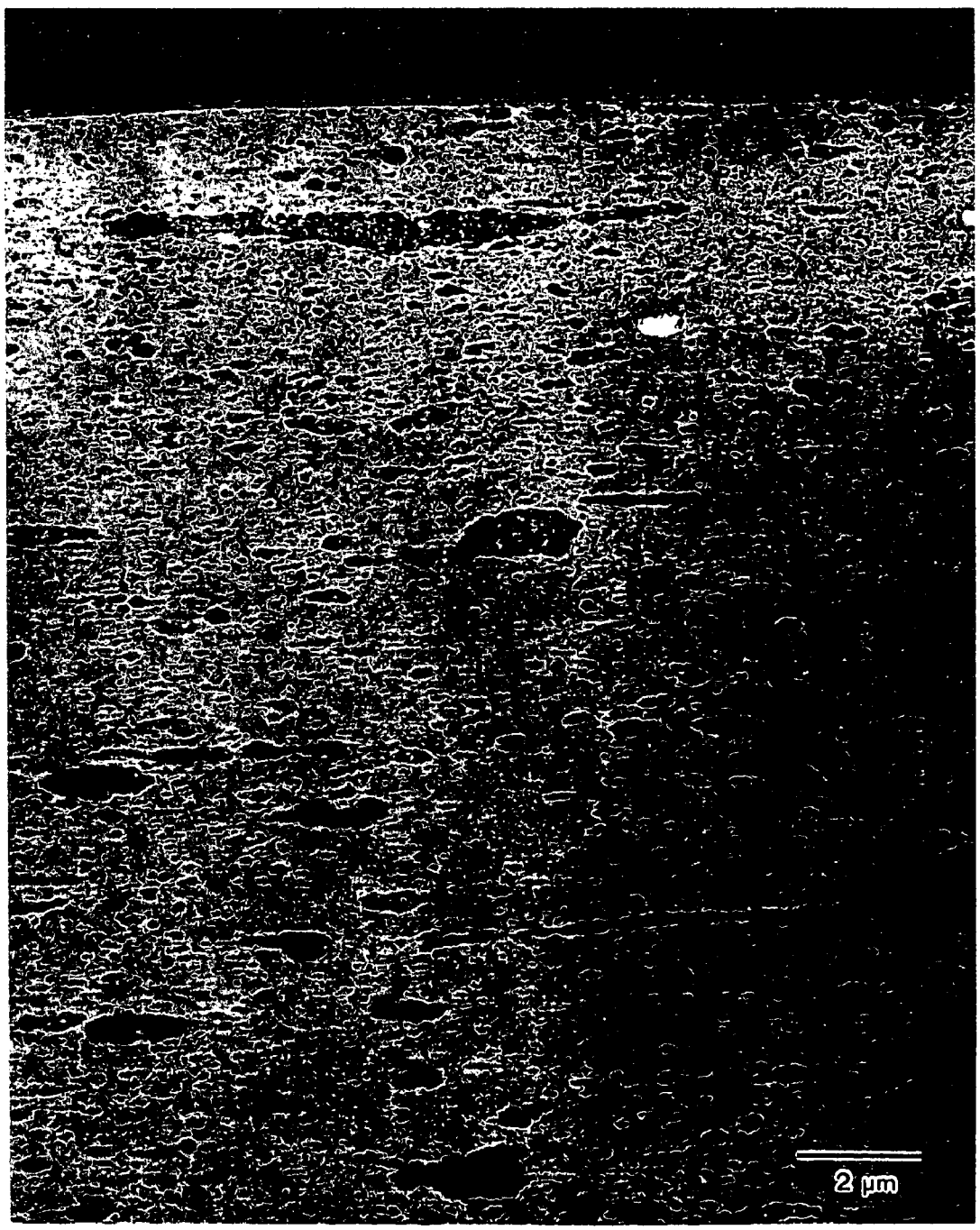
FIG. 6(a) is a TEM photomicrograph of a cross-section of the polymer electrolyte membrane produced in Example 4, which was taken in a thicknesswise direction thereof.
Figure 6B:
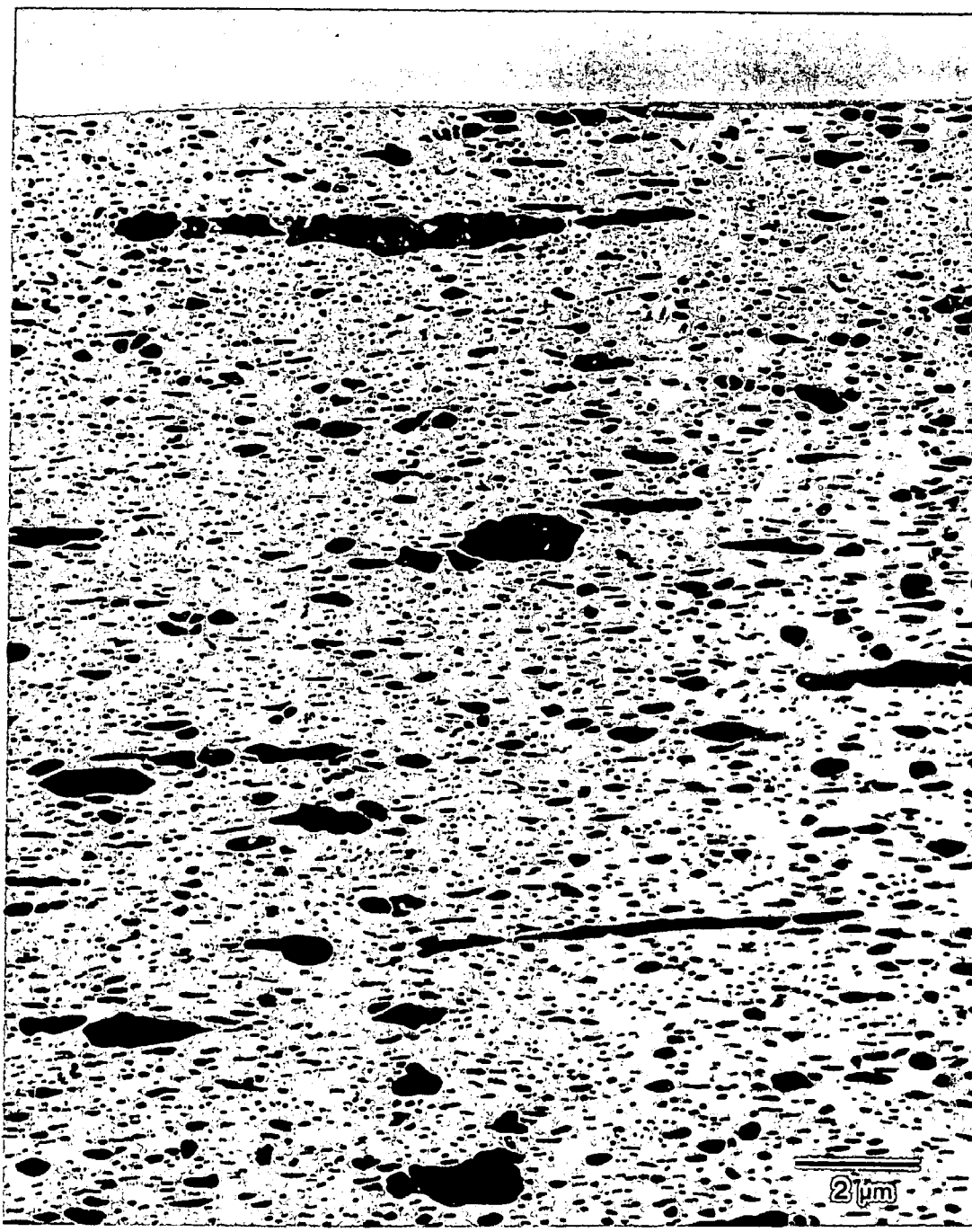
FIG. 6(b) is an image obtained by subjecting the TEM photomicrograph of FIG. 6(a) to a binarization treatment which is a preparatory operation for enabling a subsequent image processing to be performed in an adequate manner (wherein the "binarization treatment" is a treatment in which each of the gray portions in the TEM photomicrograph of FIG. 6(a) is individually classified as being either black or white, and the gray portions which are classified as being black are processed so as to change the gray color thereof to black color)

With respect to the sea/islands structure, it is preferred that the ratio of the island particles in the sea/islands structure is from 0.1 to 70%, more advantageously 1 to 70%, still more advantageously 5 to 50%, in terms of the percentage of the total area of the island particles in the 15 µm×15 µm area of the cross-section of the membrane. Further, it is preferred that the density of the island particles in the sea/islands structure is from 0.1 to 100 island particles/µm² in the 15 µm×15 µm area of the cross-section of the membrane. In the present invention, the total area and density of the island particles in the sea/islands structure are determined by the method which is explained below taking the TEM photomicrograph of FIG. 6(a) as an example. First, the TEM photomicrograph of FIG. 6(a) is scanned using a scanner so as to convert the image into digital data. The thus obtained digital data is subjected to an image analysis using image analyzer IP1000 (manufactured and sold by Asahi Kasei Corporation, Japan) to measure the gray levels (on a gray scale comprised of 256 gray levels) of the image and to prepare a histogram, wherein the abscissa of the histogram is the gray scale and the ordinate of the histogram is the number of image points having a specific gray level. When the TEM photomicrograph exhibits a sea/islands structure or a structure which is similar to the sea/islands structure to some degree (that is, when the TEM photomicrograph is neither a completely black image comprised mainly of the basic polymer (b) nor a completely white image comprised mainly of the fluorinated polymer electrolyte (a)), the prepared histogram shows a bimodal distribution. The gray level value which is located between the two peaks is used as a threshold value, and an image point having a gray level which is larger than the threshold value is defined as a black point, and an image point having a gray level which is smaller than the threshold value is defined as a white point, thereby binarizing the image. (In other words, each of the gray portions in the TEM photomicrograph shown in FIG. 6(a) is individually classified as being either black or white by the above-mentioned method, and the gray portions which are classified as being black are processed so as to change the gray color thereof to black color.) As a result, the binarized image shown in FIG. 6(b) was obtained. A predetermined area of the binarized image (namely a portion corresponding to a 15 μm×15 μm area of the cross-section of the membrane) was subjected to an image processing by means of image analyzer IP1000 (manufactured and sold by Asahi Kasei Corporation, Japan) to thereby separate the image data into black, island particle portions corresponding mainly to the basic polymer (b), and the white, sea portion corresponding mainly to the fluorinated polymer electrolyte (a). Then, the number and total area of the island particles in the above-mentioned 15 μm×15 μm area were determined. The percentage of the total area of the island particles in the above-mentioned 15 μm×15 μm area was calculated. Further, the number of the island particles/μm$^2$ in the above-mentioned 15 μm×15 μm area was calculated and defined as the density of the island particles in the sea/islands structure.

When a membrane has such a sea/islands structure, it means that a portion which is composed mainly of the basic polymer (b) is uniformly microdispersed in a portion which is composed mainly of the fluorinated polymer electrolyte (a). High durability is imparted by such a structure. A representative example of such a sea/islands structure is shown in the photomicrograph of FIG. 7 (obtained in Example 5 below). On the other hand, the polymer electrolyte membrane shown in FIG. 3 (obtained in Comparative Example 3 below) does not exhibit a sea/islands structure. That is, in the membrane shown in FIG. 3, a portion composed mainly of the basic polymer (b) is not uniformly microdispersed in a portion composed mainly of the fluorinated polymer electrolyte (a), and high durability cannot be imparted by such a structure.

With respect to the ion exchange capacity of the polymer electrolyte membrane of the present invention, there is no particular limitation, but it is preferably in the range of from 0.50 to 4.00 milliequivalents, more preferably from 0.83 to 4.00 milliequivalents, still more preferably from 1.00 to 1.50 milliequivalents, per gram of the membrane. The higher the ion exchange capacity of the polymer electrolyte membrane, the higher the proton conductivity under high temperature/low humidity conditions. Therefore, when a polymer electrolyte membrane used in a fuel cell has high ion exchange capacity, the fuel cell exhibits high output during the operation thereof.

The ion exchange capacity of the polymer electrolyte membrane can be measured as follows. A membrane sample having a size of about 10 cm$^2$ is cut out from a polymer electrolyte membrane and dried under vacuum at 110° C., followed by measurement of the dry weight (W) (unit: g) of the sample. Then, the sample membrane is immersed in 50 ml of a 25° C. aqueous saturated NaCl solution to thereby generate hydrogen ions (H$^+$) from the membrane sample. The resultant mixture was subjected to neutralization titration with a 0.01 N aqueous sodium hydroxide solution, using phenolphthalein as an indicator, and the equivalent amount (M) (milliequivalent amount) of NaOH needed to neutralize the NaCl solution was determined. The ion exchange capacity (milliequivalent/g) is obtained by dividing the thus obtained M value by the W value. Further the value obtained by calculating the formula: (W value/M value)×1,000, is the equivalent weight (EW) value which is the dry weight (g) per equivalent of the ion exchange group.

With respect to the thickness of the polymer electrolyte membrane, there is no particular limitation, but it is preferably in the range of from 1 to 500 μm, more preferably from 2 to 150 μm, still more preferably from 5 to 75 μm, most preferably from 5 to 50 μm. The larger the thickness of the membrane, the higher the durability of the membrane. However, the initial property of the membrane is lowered when the membrane becomes too thick. Therefore, it is preferred that the thickness of the membrane is selected in the above-mentioned range (1 to 500 μm).

The polymer electrolyte membrane of the present invention preferably exhibits a haze value of 25% or less, more preferably 20% or less, most preferably 15% or less, as measured in accordance with JIS K 7136, when it has a thickness of 50 μm. The haze value is influenced by the degree of internal scattering of light and it depends on the thickness of the membrane. When the polymer electrolyte membrane of the present invention has a thickness other than 50 μm, it is preferred that the membrane exhibits a calculated haze value ($H_{50}$) of 25% or less, wherein the calculated haze value ($H_{50}$) is defined as a haze value calculated on the assumption that the polymer electrolyte membrane has a thickness of 50 μm, the calculated haze value ($H_{50}$) being obtained by the following formula:

$$H_{50} = 100 \cdot \left\{ 1 - \left( \frac{100 - H_t}{100} \right)^{\frac{50}{t}} \right\}$$

wherein t represents the thickness (μm) of the polymer electrolyte membrane, and $H_t$ represents the haze value of the polymer electrolyte membrane, as measured in accordance with JIS K 7136.

When the haze value is in the above-mentioned range (i.e., the case where the membrane has a thickness of 50 μm and a haze value of 25% or less as measured in accordance with JIS K 7136, or the case where the membrane has a thickness other than 50 μm and a calculated haze value ($H_{50}$) of 25% or less), it means that the membrane has a structure wherein a portion composed mainly of the basic polymer (b) is uniformly microdispersed in a portion composed mainly of the fluorinated polymer electrolyte (a), and the membrane exhibits high durability.

With respect to the state of each of the fluorinated polymer electrolyte (a) and the basic polymer (b) in the polymer electrolyte membrane of the present invention, there is no particular limitation. For example, components (a) and (b) may be in the form of a simple physical mixture. Alternatively, at least a part of component (a) and at least a part of component (b) may be reacted with each other (e.g., component (a) and component (b) may be ionically bonded to each other, thereby forming an acid-base ion complex, or component (a) and component (b) may be covalently bonded to each other).

Whether or not the fluorinated polymer electrolyte (a) and the basic polymer (b) are chemically bonded to each other can be confirmed by means of a Fourier-Transform Infrared Spectrometer (hereinafter abbreviated to "FT-IR"). Specifically, when a polymer electrolyte membrane comprising the fluorinated polymer electrolyte (a) and the basic polymer (b) is subjected to an FT-IR analysis, and an absorption peak ascribed to a compound other than any of the fluorinated polymer electrolyte (a) and the basic polymer (b) is detected, it can be concluded that components (a) and (b) are chemically bonded to each other. For example, when the polymer electrolyte membrane of the present invention which comprises a perfluorocarbon polymer represented by formula (3) above and poly[(2,2'-(m-phenylene)-5,5'-bibenzimidazol] (hereinafter referred to as "PBI") represented by formula (7) above, is subjected to an FT-IR analysis, absorption peaks are detected at 1460 cm$^{-1}$, 1565 cm$^{-1}$ and 1635 cm$^{-1}$. These results show that a chemical bond is present between components (a) and (b) in the membrane.

The polymer electrolyte membrane of the present invention may be reinforced by conventional methods. As examples of conventional methods for reinforcing the membrane, there can be mentioned a reinforcing method by the addition of PTFE fibrils (see Unexamined Japanese Patent Application Laid-Open Specification No. Sho 53-149881 (corresponding to U.S. Pat. No. 4,218,542) and Examined Japanese Patent Application Publication No. Sho 63-61337 (corresponding to EP 94679 B)); a reinforcing method using a stretched porous PTFE membrane (see Examined Japanese Patent Application Publication No. Hei 5-75835 and Japanese Patent Application prior-to-examination Publication (kohyo) No. Hei 11-501964 (corresponding to U.S. Pat. Nos. 5,599,614 and 5,547,551)); a reinforcing method by the addition of inorganic particles (such as $Al_2O_3$, $SiO_2$, $TiO_2$ and $ZrO_2$) (see Unexamined Japanese Patent Application Laid-Open Specification Nos. Hei 6-111827 and Hei 9-219206 and U.S. Pat. No. 5,523,181); a reinforcing method by crosslinking (see Unexamined Japanese Patent Application Laid-Open Specification No. 2000-188013); and a reinforcing method using a sol-gel reaction to incorporate silica into the membrane (see K. A. Mauritz, R. F. Storey and C. K. Jones, in Multiphase Polymer Materials: Blends and Ionomers, L. A. Utracki and R. A. Weiss, Editors, ACS Symposium Series No. 395, p. 401, American Chemical Society, Washington, D.C. (1989)). Therefore, the polymer electrolyte membrane of the present invention may have at least one reinforcement selected from the group consisting of a reinforcement contained in the membrane and a reinforcement secured to a surface of the membrane.

(Examples of Methods for Producing the Polymer Electrolyte Membrane of the Present Invention)

A method for producing the polymer electrolyte membrane of the present invention is described below, but it should not be construed as limiting the scope of the present invention.

The polymer electrolyte membrane of the present invention can be produced, for example, by the following method.

A method for producing a polymer electrolyte membrane, comprising:

providing a casting liquid in which a liquid medium comprising a protic solvent is mixed with a polymer mixture of:

(a) 50.000 to 99.999% by weight, based on the total weight of components (a) and (b), of a fluorinated polymer electrolyte having an ion exchange group, and (b) 0.001 to 50.000% by weight, based on the total weight of components (a) and (b), of a basic polymer, casting the casting liquid onto a substrate to thereby form a liquid coating on the substrate, and removing the liquid medium from the liquid coating to thereby form a solid polymer electrolyte membrane.

For example, the above-mentioned casting liquid may be an emulsion (in which liquid particles are dispersed in a continuous liquid phase, wherein the liquid particles are colloidal particles or are particles larger than colloidal particles), a suspension (in which solid particles are dispersed in a continuous liquid phase, wherein the solid particles are colloidal particles or are particles having a size which can be seen through a microscope), a colloidal liquid (in which macromolecules are dispersed in a liquid) or a micellar liquid (which is a lyophilic colloidal dispersion comprising many small molecules which are associated by an intermolecular force). Further, the casting liquid may be a composite system comprising a combination of two or more of the above-mentioned liquids.

By the above-mentioned method which uses a casting liquid containing a liquid medium comprising a protic solvent, there can be produced a polymer electrolyte membrane in which the basic polymer (b) is uniformly microdispersed in the fluorinated polymer electrolyte (a). The term "protic solvent" used herein means a solvent having a functional group which is capable of generating a proton. Examples of such protic solvents include water, alcohols (such as methanol, ethanol, propanol and isopropanol) and phenols. Of these, most preferred is water. With respect to the amount of the protic solvent used, there is no particular limitation. However, it is preferred that the amount of the protic solvent is 0.5 to 99.5% by weight, more advantageously 1 to 90% by weight, still more advantageously 10 to 60% by weight, based on the weight of the liquid medium in the casting liquid.

These protic solvents may be used individually or in combination. Use of a mixed solvent comprising water and an alcohol is especially preferred, and more preferred are a mixed solvent comprising water and ethanol and having a water/ethanol volume ratio of from 3/1 to 1/3 and a mixed solvent comprising water and isopropanol and having a water/isopropanol volume ratio of from 3/1 to 1/3.

It is preferred that the liquid medium of the casting liquid further comprises an aprotic solvent. The term "aprotic solvent" used herein means a solvent other than the protic solvent defined above. Examples of such aprotic solvents include N,N-dimethylformamide, N,N-dimethylacetamide, N-methylpyrrolidone, dimethylsulfoxide, acetone and methyl ethyl ketone. These aprotic solvents may be used individually or in combination. It is especially preferred that N,N-dimethylformamide, N,N-dimethylacetamide, N-methylpyrrolidone or dimethylsulfoxide is used as the aprotic solvent. With respect to the amount of the aprotic solvent used, there is no particular limitation. However, it is preferred that the amount of the aprotic solvent is 99.5 to 0.5% by weight, more advantageously 99 to 10% by weight, most advantageously 90 to 40% by weight, based on the weight of the liquid medium in the casting liquid.

With respect to the concentration of the liquid medium in the casting liquid, there is no particular limitation. However, it is preferred that the concentration of the liquid medium is 20.000 to 99.989% by weight, more advantageously 40.000 to 99.895% by weight, most advantageously 75.000 to 98.990% by weight, based on the weight of the casting liquid.

With respect to the concentration of the fluorinated polymer electrolyte (a) in the casting liquid, there is no particular limitation. However, it is preferred that the concentration of the fluorinated polymer electrolyte (a) in the casting liquid is 0.010 to 50.000% by weight, more advantageously 0.100 to 40.000% by weight, most advantageously 1.000 to 20.000% by weight, based on the weight of the casting liquid.

In addition, with respect to the concentration of the basic polymer (b) in the casting liquid, there is no particular limitation. However, it is preferred that the concentration of the basic polymer (b) in the casting liquid is 0.001 to 30.000% by weight, more advantageously 0.005 to 20.000% by weight, most advantageously 0.010 to 5.000% by weight, based on the weight of the casting liquid.

With respect to the weight ratio of the fluorinated polymer electrolyte (a) and basic polymer (b) in the casting liquid (i.e., the fluorinated polymer electrolyte (a): basic polymer (b) weight ratio), there is no particular limitation. However, it is preferred that the fluorinated polymer electrolyte (a): basic polymer (b) weight ratio is in the range of from 99.999:0.001 to 50.000:50.000, more advantageously from 99.995:0.005 to 80.000:20.000, still more advantageously from 99.900:0.100 to 95.000:5.000, most advantageously from 99.900:0.100 to 98.000:2.000.

By the use of the above-mentioned casting liquid, not only can the liquid medium be easily removed from the liquid coating, but also there can be produced a polymer electrolyte membrane having a structure wherein a phase composed mainly of the basic polymer (b) is uniformly microdispersed in a phase composed mainly of the fluorinated polymer electrolyte (a), wherein the obtained polymer electrolyte membrane has high durability while maintaining excellent proton conductivity.

The casting liquid can be prepared, for example, as follows. The basic polymer (b) is dissolved in an aprotic solvent, such as dimethylacetamide, to thereby obtain a polymer solution (hereinafter referred to as "preliminary solution A"). The fluorinated polymer electrolyte (a) is dissolved in an aprotic solvent, such as dimethylacetamide, to thereby obtain a polymer solution (hereinafter referred to as "preliminary solution B"). The preliminary solutions A and B are mixed together, followed by stirring, thereby obtaining a mixture of preliminary solutions A and B. The fluorinated polymer electrolyte (a) is dissolved in a protic solvent, to thereby obtain a polymer solution (hereinafter referred to as "preliminary solution C"). The obtained preliminary solution C is added to the above-mentioned mixture of preliminary solutions A and B, followed by stirring, thereby obtaining a casting liquid.

In general, a nitrogen-containing aromatic basic polymer, which is an example of the basic polymer (b), is soluble in an aprotic solvent, but insoluble in a protic solvent. However, it has surprisingly been found that, when the casting liquid is prepared in the above-mentioned manner, that is, when the preliminary solutions A and B are mixed together, and to the resultant mixture of preliminary solutions A and B is added the preliminary solution C containing a protic solvent, the resultant casting liquid can stably exhibit a state in which a nitrogen-containing aromatic basic polymer (used as the basic polymer (b)) is dissolved or uniformly microdispersed in the casting liquid without exhibiting precipitation. The mechanism of this phenomenon has not yet been fully elucidated, but it is considered to be that the nitrogen-containing aromatic basic polymer used as the basic polymer (b) is stabilized by some interactions between the fluorinated polymer electrolyte (a) and the nitrogen-containing aromatic basic polymer.

The basic polymer (b) can be produced by the polymerization methods described in prior art documents (see, e.g., "Jikken Kagaku Kouza 28, Koubunshi Gousei (Lectures on Experimental Chemistry 28, Polymer Synthesis)", 4th edition, edited by The Chemical Society of Japan, published by Maruzen Co., Ltd., Japan). With respect to the weight average molecular weight of the basic polymer (b), there is no particular limitation. However, it is preferred that the weight average molecular weight of the basic polymer (b) is in the range of from 10,000 to 1,000,000, more advantageously from 20,000 to 100,000, most advantageously from 50,000 to 100,000. The weight average molecular weight can be measured by gel permeation chromatography (GPC).

As an index of the degree of polymerization, the intrinsic viscosity (dL/g) may be used instead of the weight average molecular weight. The intrinsic viscosity of the basic polymer (b) can be calculated by the below-mentioned formula, from the viscosity ($\eta P$) (mPa·s) of a polymer solution obtained by dissolving the basic polymer (b) in dimethylacetamide, the viscosity ($\eta S$) (mPa·s) of dimethylacetamide and the polymer concentration (Cp) (g/dL) of the above-mentioned polymer solution. The viscosity mentioned herein is a value as measured, for example, at 25° C. by means of a cone-plate type rotating viscometer (e.g., E type viscometer).

Intrinsic viscosity=$\ln(\eta P/\eta S)/Cp$ wherein ln represents a natural logarithm.

It is preferred that the intrinsic viscosity of the basic polymer (b) is in the range of from 0.1 to 10.0 dL/g, more advantageously from 0.3 to 5.0 dL/g, most advantageously from 0.5 to 1.0 dL/g.

The preliminary solution A can be obtained, for example, by charging the basic polymer (b) and an aprotic solvent into an autoclave and subjecting the resultant mixture to heat treatment at 40 to 300° C. for 10 minutes to 100 hours. The content of the basic polymer (b) in the preliminary solution A is preferably in the range of from 0.01 to 50% by weight, more preferably from 0.1 to 30% by weight, most preferably from 1 to 10% by weight, based on the weight of the preliminary solution A.

A perfluorocarbon polymer having a proton exchange group is a representative example of the fluorinated polymer electrolyte (a) contained in the preliminary solutions B and C. A perfluorocarbon polymer can be produced by a method in which a precursor polymer represented by formula (7) below is prepared by the polymerization reaction performed in the below-mentioned manner, and the resultant precursor polymer is subjected to hydrolysis treatment and acid treatment.

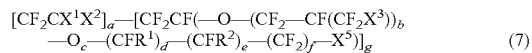
(7)

wherein:

each of $X^1$, $X^2$ and $X^3$ independently represents a halogen atom or a $C_1$-$C_3$ perfluoroalkyl group;

$0 \leq a < 1$, $0 < g \leq 1$ and $a+g=1$;

$0 \leq b \leq 8$;

c is 0 or 1;

each of d, e and f is a number in the range of from 0 to 6, provided that d+e+f is not 0;

each of $R^1$ and $R^2$ independently represents a halogen atom, a $C_1$-$C_{10}$ perfluoroalkyl group or a $C_1$-$C_{10}$ fluorochloroalkyl group; and $X^5$ represents —$COOR^3$, —$COR^4$ or —$SO_2R^4$, wherein $R^3$ represents a $C_1$-$C_3$ non-fluorinated alkyl group and $R^4$ represents a halogen atom.

The precursor polymer represented by formula (7) above can be produced by copolymerizing a fluoroolefin and a vinyl fluoride compound. Examples of fluoroolefins include $CF_2$=$CF_2$, $CF_2$=$CFCl$ and $CF_2$=$CCl_2$. Examples of vinyl fluoride compounds include $CF_2$=$CFO(CF_2)_z$—$SO_2F$, $CF_2$=$CFOCF_2CF(CF_3)O(CF_2)_z$—$SO_2F$, $CF_2$=$CF(CF_2)_z$—$SO_2F$, $CF_2$=$CF(OCF_2CF(CF_3))_z$—$(CF_2)_{z-1}$—$SO_2F$, $CF_2$=$CFO(CF_2)_z$—$CO_2R$, $CF_2$=$CFOCF_2CF(CF_3)O(CF_2)_z$—$CO_2R$, $CF_2$=$CF(CF_2)_z$—$CO_2R$ and $CF_2$=$CF(OCF_2CF(CF_3))_z$—$(CF_2)_2$—$CO_2R$ (wherein Z is an integer in the range of from 1 to 8 and R represents a $C_1$-$C_3$ non-fluorinated alkyl group).

Examples of polymerization methods for producing precursor polymers include a solution polymerization method (in which a vinyl fluoride compound is dissolved in a solvent, such as flon (i.e., chlorofluorocarbon), and the resultant solution is reacted with tetrafluoroethylene gas, to thereby copolymerize the vinyl fluoride compound and tetrafluoroethylene), a bulk polymerization method (in which a copolymerization reaction is performed without using a solvent, such as flon), and an emulsion polymerization method (in which a vinyl fluoride compound and a surfactant are added to water to thereby emulsify the vinyl fluoride compound, and the resultant emulsion is reacted with tetrafluoroethylene gas, to thereby copolymerize the vinyl fluoride compound and tetrafluoroethylene). In any of the above-mentioned polymerization methods, it is preferred that the polymerization reaction is performed under conditions wherein the reaction temperature is in the range of from 30 to 90° C. and the reaction pressure is in the range of from 280 to 1,100 kPa.

With respect to the melt index of the thus produced precursor polymers, there is no particular limitation. However, the melt index (MI) (g/10 min) as measured in accordance with JIS K-7210 under conditions wherein the temperature is 270° C., the load is 2.16 kgf and the inner diameter of orifice is 2.09 mm, is preferably in the range of from 0.001 to 1,000, more preferably from 0.01 to 100, most preferably from 0.1 to 10.

Next, the precursor polymer is immersed in a basic reactive liquid, to thereby perform hydrolysis treatment at 10 to 90° C. for 10 seconds to 100 hours. With respect to the basic reactive liquid used, there is no particular limitation, but the basic reactive liquid is preferably an aqueous solution of an alkali metal hydroxide (such as potassium hydroxide or sodium hydroxide) or an aqueous solution of an alkaline earth metal hydroxide. With respect to the content of the alkali metal hydroxide or alkaline earth metal hydroxide in the basic reactive liquid, there is no particular limitation. However, it is preferred that the content of the alkali metal hydroxide or alkaline earth metal hydroxide is in the range of from 10 to 30% by weight, based on the weight of the basic reactive liquid. It is preferred that the basic reactive liquid contains an organic swelling compound, such as dimethyl sulfoxide or methyl alcohol. It is preferred that the content of the organic swelling compound in the basic reactive liquid is 1 to 30% by weight, based on the weight of the basic reactive liquid.

After the hydrolysis treatment, the precursor polymer is subjected to acid treatment with an acid, such as hydrochloric acid, thereby obtaining a perfluorocarbon polymer having a proton exchange group. With respect to the proton exchange capacity of the perfluorocarbon polymer having a proton exchange group, there is no particular limitation. However, it is preferred that the proton exchange capacity is 0.50 to 4.00 milliequivalents per gram of the polymer, more advantageously 1.00 to 4.00 milliequivalents per gram of the polymer, most advantageously 1.25 to 2.50 milliequivalents per gram of the polymer.

Next, the perfluorocarbon polymer having a proton exchange group and a protic solvent are charged into an autoclave, and the resultant mixture is subjected to heat treatment at 40 to 300° C. for 10 minutes to 100 hours, to thereby obtain the preliminary solution C, which comprises a protic solvent having dissolved therein a perfluorocarbon polymer having a proton exchange group. The term "solution" used herein also covers a dispersion in which the perfluorocarbon polymer is dispersed in the form of a micelle. It is preferred that the content of the perfluorocarbon polymer in the preliminary solution C is in the range of from 0.1 to 50% by weight, more advantageously from 0.1 to 30% by weight, most advantageously from 1 to 10% by weight, based on the weight of the preliminary solution C.

The preliminary solution B can be produced by either a method in which the perfluorocarbon polymer having a proton exchange group and an aprotic solvent are charged into an autoclave, and the resultant mixture is subjected to heat treatment at 40 to 300° C. for a period of time of from 10 minutes to 100 hours; or a method in which the solvent (a protic solvent) contained in the preliminary solution C is replaced by an aprotic solvent (that is, the protic solvent contained in the preliminary solution C is removed by volatilization to thereby obtain a residue and, then, an aprotic solvent is added to the residue). It is preferred that the content of the above-mentioned perfluorocarbon polymer in the preliminary solution B is in the range of from 0.01 to 50% by weight, more advantageously from 0.1 to 30% by weight, most advantageously from 1 to 10% by weight, based on the weight of the preliminary solution B.

The preliminary solutions A and B respectively produced in the above-mentioned manners are mixed together by a conventional stirring method, and to the resultant mixture is added the preliminary solution C, followed by further stirring, to thereby obtain a casting liquid. If desired, the casting liquid may be subjected to concentration.

Next, the obtained casting liquid is cast onto a substrate to thereby form a liquid coating on the substrate and, then, the liquid medium is removed from the liquid coating to thereby form the polymer electrolyte membrane of the present invention. The casting may be performed by a conventional coating method, for example, by means of a gravure roll coater, a natural roll coater, a reverse roll coater, a knife coater and a dip coater. With respect to the substrate used for casting, there is no particular limitation, and a conventional polymer film, a metal foil and a plate made of alumina or Si can be suitably used. Before the preparation of a membrane/electrode assembly (which is explained below), if desired, the substrate is removed from the polymer electrolyte membrane. The polymer electrolyte membrane of the present invention can also be produced by impregnating the stretched porous PTFE membrane described in Examined Japanese Patent Application Publication No. Hei 5-75835 with the casting liquid, followed by removal of the liquid medium from the impregnated casting liquid, thereby producing a solid polymer electrolyte membrane having a reinforcement (the porous PTFE membrane) contained in the membrane. Alternatively, the polymer electrolyte membrane of the present invention can also be produced by a process in which PTFE fibrils or the like are added to the casting liquid and, then, the casting liquid is cast onto a substrate to form a liquid coating, followed by removal of the liquid medium from the liquid coating, to thereby produce a solid polymer electrolyte membrane reinforced with fibrils contained in the membrane (this reinforcing method is described in Unexamined Japanese Patent Application Laid-Open Specification No. Sho 53-149881 and Examined Japanese Patent Application Publication No. Sho 63-61337).

If desired, the polymer electrolyte membrane obtained in the above-mentioned manner may be subjected to heat treatment (i.e., annealing) at 40 to 300° C., preferably at 80 to 200° C. (The heat treatment not only enables the complete removal of the liquid medium from the membrane, but also stabilizes the structures of components (a) and (b).) In addition, for causing the polymer electrolyte membrane to fully exhibit its inherent ion exchange capacity, if desired, the polymer electrolyte membrane may be subjected to acid treatment using hydrochloric acid, nitric acid or the like. (Even when some of the ion exchange groups of the polymer electrolyte membrane are replaced by a salt, such a salt can be converted back to an ion exchange group by the acid treatment.) Further, the polymer electrolyte membrane may be subjected to stretch orientation by means of a lateral monoaxial tenter or a simultaneous biaxial tenter.

(Membrane/Electrode Assembly)

In a polymer electrolyte fuel cell, the polymer electrolyte membrane of the present invention is used in the form of a membrane/electrode assembly (hereinafter frequently referred to as "MEA") which is obtained by securely sandwiching the polymer electrolyte membrane between an anode and a cathode. The anode used herein comprises an anodic catalyst layer and is proton-conductive, and the cathode used herein comprises a cathodic catalyst layer and is proton-conductive. Further, the MEA may further comprise two gas diffusion layers (explained below) which are, respectively, securely disposed on the outer surfaces of the anodic catalyst layer and cathodic catalyst layer.

The anodic catalyst layer comprises a catalyst which oxidizes a fuel (e.g., hydrogen) to easily generate a proton, and the cathodic catalyst layer comprises a catalyst which catalyzes a reaction between a proton, an electron and an oxidant (e.g., oxygen or air) to generate water. As the catalyst contained in each of the anode and the cathode, platinum or an alloy of platinum and ruthenium or the like can be used, and it is preferred that the catalyst is in the form of particles having a particle diameter in the range of from 10 to 1,000 Å. In addition, it is also preferred that the catalyst particles are supported on conductive particles which have a particle diameter in the range of from 0.01 to 10 µm, such as particles of furnace black, channel black, acetylene black, carbon black, an activated carbon, graphite and the like. It is preferred that the amount of the catalyst particles in the catalyst layer is 0.001 to 10 mg/cm$^2$ of the projected area of the catalyst layer.

In addition, it is preferred that each of the anodic catalyst layer and the cathodic catalyst layer contains the perfluorocarbon sulfonic acid polymer represented by the formula (2) or (3) above, and the amount of the polymer in the catalyst layer is 0.001 to 10 mg/cm$^2$ of the projected area of the catalyst layer.

As a method for producing the MEA, there can be mentioned, for example, the following method. A perfluorocarbon sulfonic acid polymer is dissolved in a mixed solvent comprised of an alcohol and water to thereby obtain a solution, and a commercially available carbon-supported platinum (e.g., TEC10E40E, manufactured and sold by Tanaka Kikinzoku Kogyo K.K., Japan) as a catalyst is dispersed in the above-obtained solution, thereby obtaining a paste. A predetermined amount of the obtained paste is applied onto one surface of each of two PTFE sheets, and the applied paste is dried to thereby form a catalyst layer on each PTFE sheet. The polymer electrolyte membrane of the present invention is sandwiched between the above-prepared PTFE sheets each having a catalyst layer so that the catalyst layers contact both surfaces of the polymer electrolyte membrane. The resultant assembly is subjected to hot pressing at 100 to 200° C. to thereby transferring/bonding the catalyst layers to both surfaces of the polymer electrolyte membrane and, then, the PTFE sheets are removed from the assembly, thereby obtaining an MEA. Such method for producing an MEA is well known to a person skilled in the art. For example, the method for producing an MEA is described in detail in "JOURNAL OF APPLIED ELECTROCHEMISTRY", 22 (1992), pp. 1-7.

A commercially available carbon cloth or carbon paper can be used as a gas diffusion layer. As a representative example of a carbon cloth, there can be mentioned carbon cloth E-tek, B-1 (manufactured and sold by DE NORA NORTH AMERICA, U.S.A.). As representative examples of carbon papers, there can be mentioned CARBEL (trade mark; manufactured and sold by JAPAN GORE-TEX INC., Japan), TGP-H (manufactured and sold by Toray Industries, Inc., Japan), and carbon paper 2050 (manufactured and sold by SPCTRACORP, U.S.A.). A structure in which an electrode catalyst layer and a gas diffusion layer are unified with each other is called a "gas diffusion electrode". The MEA can also be obtained by bonding gas diffusion electrodes to the polymer electrolyte membrane of the present invention. As a representative example of a commercially available gas diffusion electrode, there can be mentioned gas diffusion electrode ELAT (trade mark; manufactured and sold by DE NORA NORTH AMERICA, U.S.A.) (in which a carbon cloth is used as a gas diffusion layer).

(Polymer Electrolyte Fuel Cell)

Basically, an operable polymer electrolyte fuel cell can be obtained by connecting the anode and cathode of the above-mentioned MEA to each other through an electron conductive material which is positioned in the outside of the polymer electrolyte membrane. A method for producing a polymer electrolyte fuel cell is well known to a person skilled in the art. For example, methods for producing a polymer electrolyte fuel cell are described in detail in "FUEL CELL HANDBOOK" (VAN NOSTRAND REINHOLD, A. J. APPLEBY et al, ISBN: 0-442-31926-6); "Kagaku Wan Pointo, Nenryou Denti (One Point in Chemistry, fuel cell)", 2nd edition, edited by Masao TANIGUCHI and Manabu SENOO, published by KYORITSU SHUP-PAN CO., LTD., Japan, 1992.

Examples of electron conductive materials include current collectors which are plates having, formed thereon, channels for flowing a gaseous fuel, a gaseous oxidant and the like and which are made of, for example, a material selected from the group consisting of graphite, a composite material comprising graphite and a resin, and a metal. When the MEA has no gas diffusion layer bonded thereto, the MEA is incorporated (together with separately provided two gas diffusion layers) into a casing for a single cell (e.g., PEFC single cell, manufactured and sold by ElectroChem Inc., U.S.A.) so that the gas diffusion layers are positioned on the outer surfaces of the anode and cathode of the MEA, thereby obtaining a polymer electrolyte fuel cell.

For obtaining a high voltage electricity from the cell, several single fuel cells may be stacked to produce a fuel cell in the form of a stack cell. For producing such a fuel cell in the form of a stack cell, a plurality of MEAs are prepared and incorporated into a casing for a stack cell (e.g., PEFC stack cell, manufactured and sold by ElectroChem Inc., U.S.A.). In such a fuel cell in the form of a stack cell, a current collector called a "bipolar plate" is used which serves both as a separator to separate a fuel from an oxidant supplied to an adjacent cell and as an electric connector connecting the adjacent cells.

A fuel cell is operated by supplying hydrogen to one electrode of the cell and supplying oxygen or air to the other electrode of the cell. From the viewpoint of increasing the catalyst activity of the electrodes, it is preferred that the fuel cell is operated at a temperature as high as possible. In general, the fuel cell is operated at 50 to 80° C. which is a temperature range where the control of humidity is easy. However, the fuel cell can also be operated at 80 to 150° C.

The polymer electrolyte membrane of the present invention can also be used for a chloroalkali electrolysis, a water electrolysis, a hydrohalogenic acid electrolysis, a salt electrolysis and the like, and can also be used in an oxygen concentrator, a humidity sensor, a gas sensor and the like. With respect to methods for employing a polymer electrolyte membrane in an oxygen concentrator, reference can be made to, for example, "Kagaku Kougaku (Chemical Engineering)", 56(3), pp. 178-180 (1992) and U.S. Pat. No. 4,879,016. With respect to methods for employing a polymer electrolyte membrane in a humidity sensor, reference can be made to, for example, "Nihon Ion Koukan Gakkaishi (Journal of Japan Association of Ion Exchange)", 8(3), pp. 154-165 (1997) and J. Fang et al., "Macromolecules", 35, 6070 (2002). With respect to methods for employing a polymer electrolyte membrane in a gas sensor, reference can be made to "Bunseki Kagaku (Analytical Chemistry)", 50(9), pp. 585-594 (2001)

and X. Yang, S. Johnson, J. Shi, T. Holesinger, B. Swanson: Sens. Actuators B, 45, 887 (1997).

BEST MODE FOR CARRYING THE INVENTION

Hereinbelow, the present invention will be described in more detail with reference to the following Examples and Comparative Examples, which should not be construed as limiting the scope of the present invention.

In the following Examples and Comparative Examples, evaluations and measurements were performed by the following methods.

(Haze Value Measurement)

The haze value of the polymer electrolyte membrane was measured in accordance with JIS K 7136 by means of hazegard II (manufactured and sold by Toyo Seiki Seisaku-Sho, Ltd., Japan). When the polymer electrolyte membrane had a thickness other than 50 µm, a calculated haze value ($H_{50}$) was obtained by the following formula:

$$H_{50} = 100 \cdot \left\{ 1 - \left( \frac{100 - H_t}{100} \right)^{\frac{50}{t}} \right\}$$

wherein t represents the thickness (µm) of the polymer electrolyte membrane, and $H_t$ represents the haze value of the polymer electrolyte membrane, as measured in accordance with JIS K 7136.

(Examination through TEM)

A specimen having a size of about 0.5 mm×about 15 mm was cut out from the polymer electrolyte membrane and embedded in an epoxy resin (for example, Quetol-812; manufactured and sold by NISSHIN-EM CORPORATION, Japan). The epoxy resin having the membrane specimen embedded therein was sliced in a thicknesswise direction of the membrane specimen by means of a microtome (ULTRACUT (trade mark) UCT; manufactured and sold by LEICA, Germany) (which employs a diamond knife), thereby obtaining an ultrathin specimen having a thickness of from 80 to 100 nm. The obtained ultrathin specimen was placed on a copper mesh, and the cross-section of the specimen was examined (magnification: ×3,000) through a transmission electron microscope (TEM) (H7100, manufactured and sold by Hitachi Ltd., Japan) at an acceleration voltage of 125 kV. The examination was performed on a portion selected at random in the cross-section of the specimen. The TEM image was photographed on a film and the film was developed, to thereby obtain a negative film. The obtained negative image was enlarged 4-fold and printed onto a photographic printing paper, thereby obtaining a TEM photomicrograph. From the obtained TEM photomicrograph, the percentage of the total area of the island particles in the 15 µm×15 µm area of the cross-section of the membrane, and the density of the island particles in the sea/islands structure (i.e., the number of the island particles/µm² of the 15 µm×15 µm area of the cross-section of the membrane) were determined by the method described above.

(OCV Accelerated Test)

For accelerative evaluation of the durability of the polymer electrolyte membrane under high temperature/low humidity conditions, the below-described OCV accelerated test was performed. The term "OCV" used herein is an abbreviation of an "open circuit voltage". The OCV accelerated test is a test which is performed under conditions wherein the chemical deterioration of a polymer electrolyte membrane is promoted by maintaining the membrane in an OCV state. (The details of the OCV accelerated test are described on pp. 55-57 of Asahi Kasei Corporation's report on the results of the research entitled: "kotai koubunsigata nenryoudenti no kenkyuu kaihatsu (maku kasokuhyouka gijutu no kakuritsutou ni kansurumono) (Research and development of polymer electrolyte fuel cell (studies for establishing accelerative evaluation techniques for membranes))" (wherein the research was made on commission from the New Energy and Industrial Technology Development Organization, Japan, 2002).

A polymer electrolyte membrane was sandwiched between an anodic gas diffusion electrode and an cathodic gas diffusion electrode. The resultant assembly was incorporated into an evaluation cell. Each of the gas diffusion electrodes used was produced as follows. A 5% by weight ethanol/water solution of perfluorosulfonic acid polymer (SS-910; manufactured and sold by Asahi Kasei Corporation, Japan)(equivalent weight value (EW) of the polymer: 910; solvent formulation (weight ratio): ethanol/water=50/50) was applied onto a gas diffusion electrode ELAT (trade mark) (manufactured and sold by DE NORA NORTH AMERICA, U.S.A.) (amount of Pt: 0.4 mg/cm²) and, then, the electrode having the polymer solution applied thereon was dried at 140° C. in air, thereby obtaining a polymer-coated gas diffusion electrode. The amount of the polymer carried on the polymer-coated gas diffusion electrode was 0.8 mg/cm².

The evaluation cell was set in a fuel cell evaluation apparatus (trade name: fuel cell evaluation system 890CL; manufactured and sold by TOYO Corporation, Japan). After elevating the temperature of the cell, a hydrogen gas and air were flowed to the anode and cathode, respectively, each at a flow rate of 200 cc/min, thereby maintaining the membrane in an OCV state. The hydrogen gas and air were moistened by a water-bubbling method before supplying the hydrogen gas and air to the cell.

The OCV accelerated test was performed under two types of conditions, namely, the cell temperature was varied to be 100° C. and 120° C. When the cell temperature was 100° C., the gases were moistened at 50° C. and the anode side and cathode side in the cell were not pressurized (i.e., atmospheric pressure). On the other hand, when the cell temperature was 120° C., the gases were moistened at 60° C., and the anode side and cathode side in the cell were pressurized under 0.2 MPa (in terms of absolute pressure) and 0.15 MPa (in terms of absolute pressure), respectively.

For determining whether or not a pinhole occurred in the polymer electrolyte membrane, the hydrogen permeability of the membrane was measured every 10 hours from the start of the test, by means of a gas permeability analyzer by the flow method (GTR-100FA; manufactured and sold by GTR TEC Corp., Japan). While maintaining the anode side in the evaluation cell under 0.15 MPa with the hydrogen gas, argon as a carrier gas was flowed to the cathode side in the evaluation cell at a flow rate of 10 cc/min. The hydrogen gas which permeated from the anode side to the cathode side in the evaluation cell (i.e., cross-leaked hydrogen gas) was introduced into gas chromatograph G2800 together with the carrier gas, thereby determining the amount of hydrogen permeation. The hydrogen permeability (L) (cc×cm/cm²/sec/Pa) is calculated by the following formula:

$$L = (X \times B \times T)/(P \times A \times D)$$

wherein:
X (cc) represents the amount of hydrogen permeation,
B represents the correction coefficient (=1.100), T (cm) represents the thickness of the polymer electrolyte membrane, P (Pa) represents the hydrogen partial pressure, A ($cm^2$) represents the hydrogen permeation area of the polymer electrolyte membrane, and D (sec) represents the measurement time.

The test was terminated when the hydrogen permeability became 10 times that of the intact polymer electrolyte membrane which was not subjected to the OCV accelerated test.

(Evaluation of the Fuel Cell Properties of the Polymer Electrolyte Membrane)

The evaluation of the fuel cell properties of the polymer electrolyte membrane was performed as follows.

First, an electrode catalyst layer was formed as follows. A 5% by weight ethanol/water solution of perfluorosulfonic acid polymer (SS-910; manufactured and sold by Asahi Kasei Corporation, Japan)(equivalent weight value (EW) of the polymer: 910; solvent formulation (weight ratio): ethanol/water=50/50) was concentrated to obtain an 11% by weight ethanol/water solution of perfluorosulfonic acid polymer. Then, 1.00 g of a carbon-supported platinum (trade name: TEC10E40E; manufactured and sold by Tanaka Kikinzoku Kogyo K.K., Japan) (Pt content: 36.4% by weight), 3.31 g of the above-obtained 11% by weight ethanol/water solution of perfluorosulfonic acid polymer and 3.24 g of ethanol were thoroughly mixed together by means of a homogenizer to obtain an electrode ink. The obtained electrode ink was applied onto two PTFE sheets by a screen printing process, wherein in the case of one of the two PTFE sheet, the electrode ink was applied onto one surface of the PTFE sheet in an amount such that the amounts of Pt and the perfluorosulfonic acid polymer on the PTFE sheet were both 0.15 $mg/cm^2$; and in the case of the other PTFE sheet, the electrode ink was applied onto one surface of the PTFE sheet in an amount such that the amounts of Pt and the perfluorosulfonic acid polymer on the PTFE sheet were both 0.30 $mg/cm^2$. Then, the resultant electrode ink layers formed on the PTFE sheets were dried, first at room temperature for 1 hour, and then at 120° C. in air for 1 hour, to thereby obtain two electrode catalyst layers each having a thickness of about 10 μm, which are formed on the PTFE sheets. The electrode catalyst layer which contained Pt and the perfluorosulfonic acid polymer each in an amount of 0.15 $mg/cm^2$ was used as an anodic catalyst layer, and the electrode catalyst layer which contained Pt and the perfluorosulfonic acid polymer each in an amount of 0.30 $mg/cm^2$ was used as a cathodic catalyst layer.

Subsequently, a polymer electrolyte membrane was sandwiched between the above-obtained PTFE sheets carrying anodic and cathodic catalyst layers so that the catalyst layers contacted both surfaces of the polymer electrolyte membrane. The resultant assembly was subjected to hot pressing at 160° C. under a pressure of 0.1 MPa, to thereby transfer/bond the anodic catalyst layer and cathodic catalyst layer to both surfaces of the polymer electrolyte membrane and, then, the PTFE sheets were removed from the assembly, thereby obtaining a membrane/electrode assembly (MEA).

Two carbon cloths (ELAT (trade name) B-1; manufactured and sold by DE NORA NORTH AMERICA, U.S.A.) were disposed on both surfaces of the obtained MEA (i.e., on the outer surfaces of the anodic catalyst layer and cathodic catalyst layer) as gas diffusion layers. Then, the MEA (having gas diffusion layers positioned on both surfaces of the MEA) was incorporated into an evaluation cell, thereby obtaining a polymer electrolyte fuel cell. The obtained polymer electrolyte fuel cell was set in a fuel cell evaluation apparatus (trade name: fuel cell evaluation system 890CL; manufactured and sold by TOYO Corporation, Japan), and the fuel cell temperature was elevated to 80° C. Then, to the anode was flowed a hydrogen gas at 260 cc/min, and to the cathode was flowed air at 880 cc/min, and both the anode side and cathode side in the cell were pressurized under a pressure of 0.20 MPa (in terms of absolute pressure). The moistening of the gases (hydrogen gas and air) was performed by a water-bubbling method, wherein the hydrogen gas and air were moistened at 90° C. and 80° C., respectively, and the moistened gases were supplied to the fuel cell. During the operation of the fuel cell, an electric current/voltage curve was obtained, and the initial property of the fuel cell was evaluated from the obtained curve.

After the evaluation of the initial property of the fuel cell, the durability test of the fuel cell was performed under two different cell temperature conditions, namely, at 100° C. and 110° C. In both cases of the two different cell temperatures, the gases flowed to the anode and cathode were moistened at 60° C.

In the durability test, when the cell temperature was 100° C., the hydrogen gas was flowed at 74 cc/min to the anode, and air was flowed at 102 cc/min to the cathode. Further, the anode side and cathode side in the cell were pressurized under pressures of 0.30 MPa and 0.15 MPa (each in terms of absolute pressure), respectively, and the fuel cell generated electricity at a current density of 0.3 $A/cm^2$.

On the other hand, when the cell temperature was 110° C., the hydrogen gas was flowed at 49 cc/min to the anode, and air was flowed at 68 cc/min to the cathode. Further, the anode side and cathode side in the cell were pressurized under pressures of 0.30 MPa and 0.20 MPa (each in terms of absolute pressure), respectively, and the fuel cell generated electricity at a current density of 0.1 $A/cm^2$.

Further, in the durability test, the electric circuit was opened for 1 minute every 10 minutes, and the OCV (open circuit voltage) was measured at an electric current value of 0 A.

In the durability test, when a pinhole occurs in the polymer electrolyte membrane, a large amount of the hydrogen gas leaks from the anode side (through the polymer electrolyte membrane) to the cathode side (this phenomenon is called a "cross-leak"). The amount of the cross-leaked hydrogen gas was examined by measuring the hydrogen gas content of the gas discharged from the cathode side, by micro gas chromatography (micro GC) using a micro GC analyzer (trade name: CP 4900; manufactured and sold by Varian Inc., Netherlands). The durability test was continued until the above-mentioned hydrogen gas content of the discharged gas became drastically increased.

Example 1

A polymer electrolyte membrane having a Nafion/PBI weight ratio of 97.5/2.5, an ion exchange capacity of 0.77 milliequivalent/g and a thickness of 50 μm was produced as follows.

A 5% by weight Nafion solution (containing Nafion™/$H_2O$/isopropanol) (manufactured and sold by Solution Technology, Inc., U.S.A) was used as preliminary solution C1. Nafion had an equivalent weight value (EW) of 1,100, wherein EW is a dry weight (g) per equivalent of a proton exchange group. On the other hand, dimethylacetamide (hereinafter referred to as "DMAC") was added to a 5% by weight Nafion solution (which was the same as preliminary solution C1), and the resultant mixture was refluxed at 120° C. for 1 hour, followed by vacuum concentration by means of an evaporator, thereby obtaining preliminary solution B1 having a Nafion/DMAC weight ratio of 1.5/98.5.

Poly[2,2'-(m-phenylene)-5,5'-bibenzimidazole] having a weight average molecular weight of 27,000 (manufactured and sold by Sigma-Aldrich Japan K.K., Japan) (hereinafter referred to as "PBI") was charged into an autoclave together with DMAC. After sealing the autoclave, the temperature of the autoclave was elevated to 200° C. and maintained at 200° C. for 5 hours. Then, the autoclave was allowed to cool to room temperature, thereby obtaining a PBI solution having a PBI/DMAC weight ratio of 10/90. The intrinsic viscosity of the obtained PBI solution was 0.8 dL/g. The PBI solution was diluted 10-fold with dimethylacetamide (DMAC), thereby obtaining preliminary solution A1 having a PBI/DMAC weight ratio of 1/99.

Next, 16.3 g of preliminary solution A1 was added to 100.0 g of preliminary solution B1, followed by stirring. To the resultant was added 97.1 g of preliminary solution C1, followed by stirring. The resultant mixture was subjected to vacuum concentration at 80° C., thereby obtaining a casting liquid. The obtained casting liquid had a Nafion concentration of 5.6% by weight and a PBI concentration of 0.14% by weight.

Figure 1A:
FIG. 1(a) is an optical photomicrograph (magnification: ×50) of the surface of the polymer electrolyte membrane produced in Example 1.
Figure 1B:
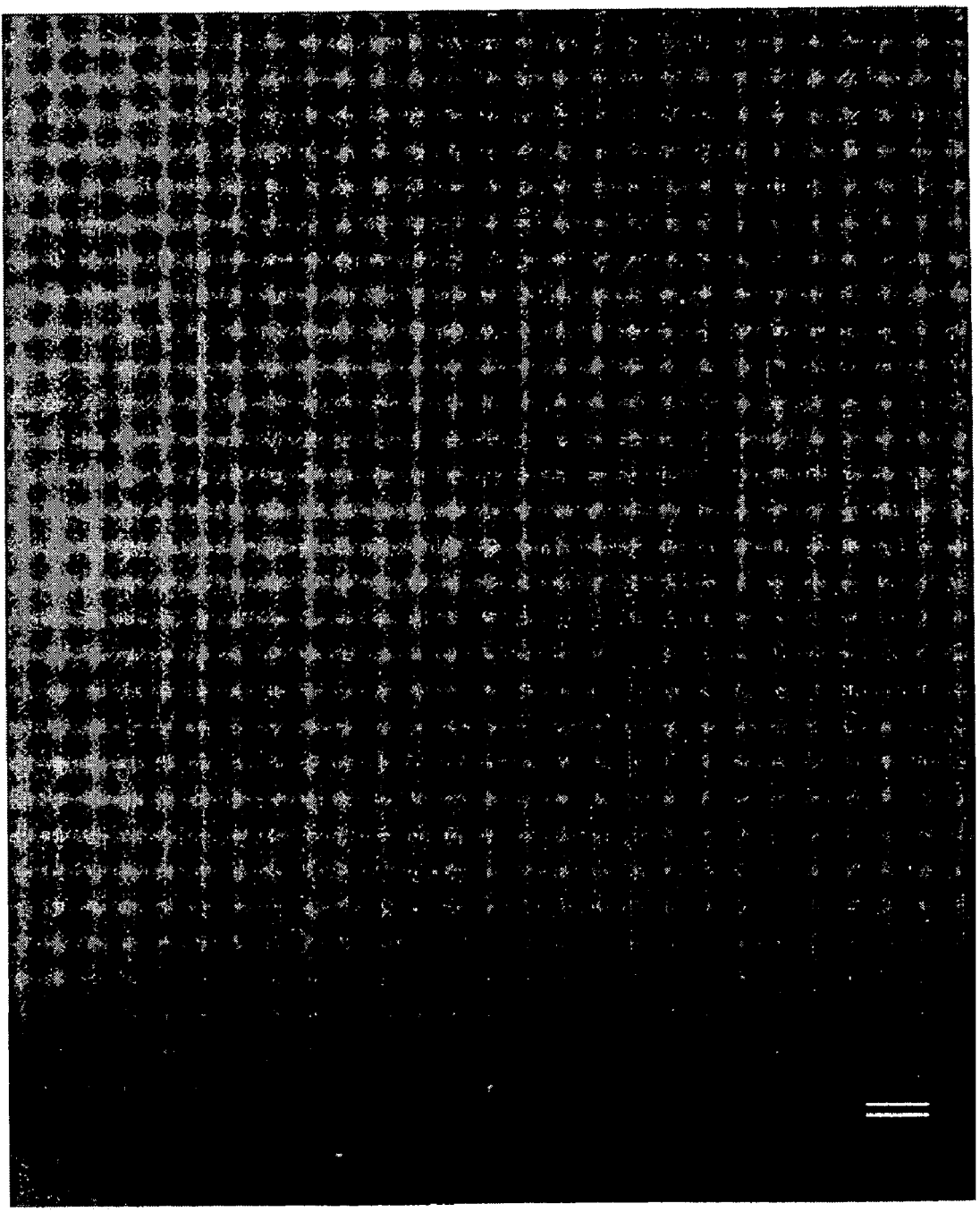
FIG. 1(b) is a transmission electron photomicrograph (TEM photomicrograph) of a cross-section of the polymer electrolyte membrane produced in Example 1, which was taken in a thicknesswise direction thereof.

32.0 g of the above-obtained casting liquid was poured into a laboratory dish having a diameter of 15.4 cm, thereby forming a liquid coating in the laboratory dish. The laboratory dish containing the liquid coating was heated on a hot plate at 60° C. for 1 hour, followed by further heating at 80° C. for 1 hour, to remove the solvent from the liquid coating, thereby forming a polymer electrolyte membrane in the laboratory dish. Then, the laboratory dish was placed in an oven, and the formed membrane was subjected to heat treatment at 160° C. for 1 hour. The laboratory dish was taken out from the oven and allowed to cool and, then, an ion exchanged water was poured into the laboratory dish, to thereby peel off the polymer electrolyte membrane from the laboratory dish. The thus obtained polymer electrolyte membrane was sandwiched between filter papers to dry the membrane, and the dried membrane was used as the polymer electrolyte membrane of the present invention. FIG. 1(a) is an optical photomicrograph (magnification: ×50) showing the surface of the obtained polymer electrolyte membrane. Although a small amount of foreign matter, such as dust, was seen in the photomicrograph, no large agglomerates of the membrane components were seen in the photomicrograph, and the membrane had a uniform appearance. The membrane was uniformly pale yellow but had high transparency. The haze value of the membrane was 0.6% ($H_{50}$=0.6%). Further, a cross-section of the polymer electrolyte membrane which was taken in a thicknesswise direction of the membrane was examined with respect to a 15 μm×15 μm area thereof through a TEM. As shown in FIG. 1(b), a sea/islands structure was observed. The ratio of the island particles in the sea/islands structure was 0.9%, in terms of the percentage of the total area of the island particles in the 15 μm×15 μm area of the cross-section, and the density of the island particles in the sea/islands structure was 0.57 island particle/μm² in the 15 μm×15 μm area of the cross-section.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.00 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 300 hours when the cell temperature was 100° C., and no pinhole occurred for more than 480 hours when the cell temperature was 110° C. As apparent from the above, the polymer electrolyte membrane exhibited excellent properties with respect to both durability and initial property.

Comparative Example 1

A Nafion membrane having an ion exchange capacity of 0.91 milliequivalent/g and a thickness of 51 μm was produced as follows.

32.0 g of the same 5% by weight Nafion solution as used in Example 1 was poured into a laboratory dish having a diameter of 15.4 cm, thereby forming a liquid coating in the laboratory dish. The laboratory dish containing the liquid coating was heated on a hot plate at 60° C. for 1 hour, followed by further heating at 80° C. for 1 hour, to remove the solvent from the liquid coating, thereby forming a Nafion membrane in the laboratory dish. Then, the laboratory dish was placed in an oven, and the formed membrane was subjected to heat treatment at 160° C. for 1 hour. The laboratory dish was taken out from the oven and allowed to cool and, then, an ion exchanged water was poured into the laboratory dish, to thereby peel off the Nafion membrane from the laboratory dish. The thus obtained Nafion membrane was sandwiched between filter papers to dry the membrane, and the dried membrane was used as a polymer electrolyte membrane. The obtained membrane was transparent and had a haze value of 0.5% ($H_{50}$=0.5%). Further, when a cross-section of the polymer electrolyte membrane which was taken in a thicknesswise direction of the membrane was examined with respect to a 15 μm×15 μm area thereof through a TEM, no sea/islands structure was observed.

The Nafion membrane was subjected to the OCV accelerated test. However, in the case where the cell temperature was 100° C., the hydrogen permeability increased drastically (i.e., a pinhole occurred) 40 hours after the start of the test, and hence the test was terminated. In the case where the cell temperature was 120° C., the hydrogen permeability increased drastically (i.e., a pinhole occurred) 20 hours after the start of the test, and hence the test was terminated. In addition, the fuel cell properties of the Nafion membrane were evaluated with respect to a membrane/electrode assembly (MEA) produced using the Nafion membrane as the polymer electrolyte membrane. The Nafion membrane in the MEA exhibited excellent initial property, namely an electric current density of 1.10 A/cm² as measured under conditions wherein the cell temperature was 80° C. and the voltage was 0.6 V. However, when the durability of the Nafion membrane in the MEA was evaluated, it was found that the durability of the Nafion membrane in the MEA was unsatisfactory. Specifically, in both of the case where the cell temperature was 100° C. and the case where the cell temperature was 110° C., the occurrence of a cross-leak increased drastically 140 hours after the start of the test, and hence the test was terminated. As apparent from the above, although the Nafion membrane had excellent initial property, its durability was unsatisfactory.

Comparative Example 2

A polymer electrolyte membrane having a Nafion/PBI weight ratio of 97.5/2.5, an ion exchange capacity of 0.85 milliequivalent/g and a thickness of 49 μm was produced by the method described in Comparative Example 3 of KR 2003-32321 A, as follows.

100 g of the same 5% by weight Nafion solution as used in Example 1 was subjected to vacuum drying at room temperature for 24 hours, thereby preparing a Nafion gel. To the Nafion gel was added 45 g of DMAC, followed by stirring for 6 hours, thereby obtaining a 10% by weight Nafion/DMAC solution. 10 g of the above-mentioned PBI and 1 g of LiCl were added to 90 g of DMAC, followed by stirring under 2 atmospheres at 120° C. for 6 hours, thereby obtaining a 10% by weight PBI/DMAC solution. The "PBI" is an abbreviation of poly[2,2'-(m-phenylene)-5,5'-bibenzimidazole] having a weight average molecular weight of 27,000. To 0.5 g of the obtained 10% by weight PBI/DMAC solution was added 20 g of the above-obtained 10% by weight Nafion/DMAC solution, followed by vigorous stirring at 120° C. for 6 hours, thereby obtaining a Nafion/PBI/DMAC blend solution.

Figure 2:
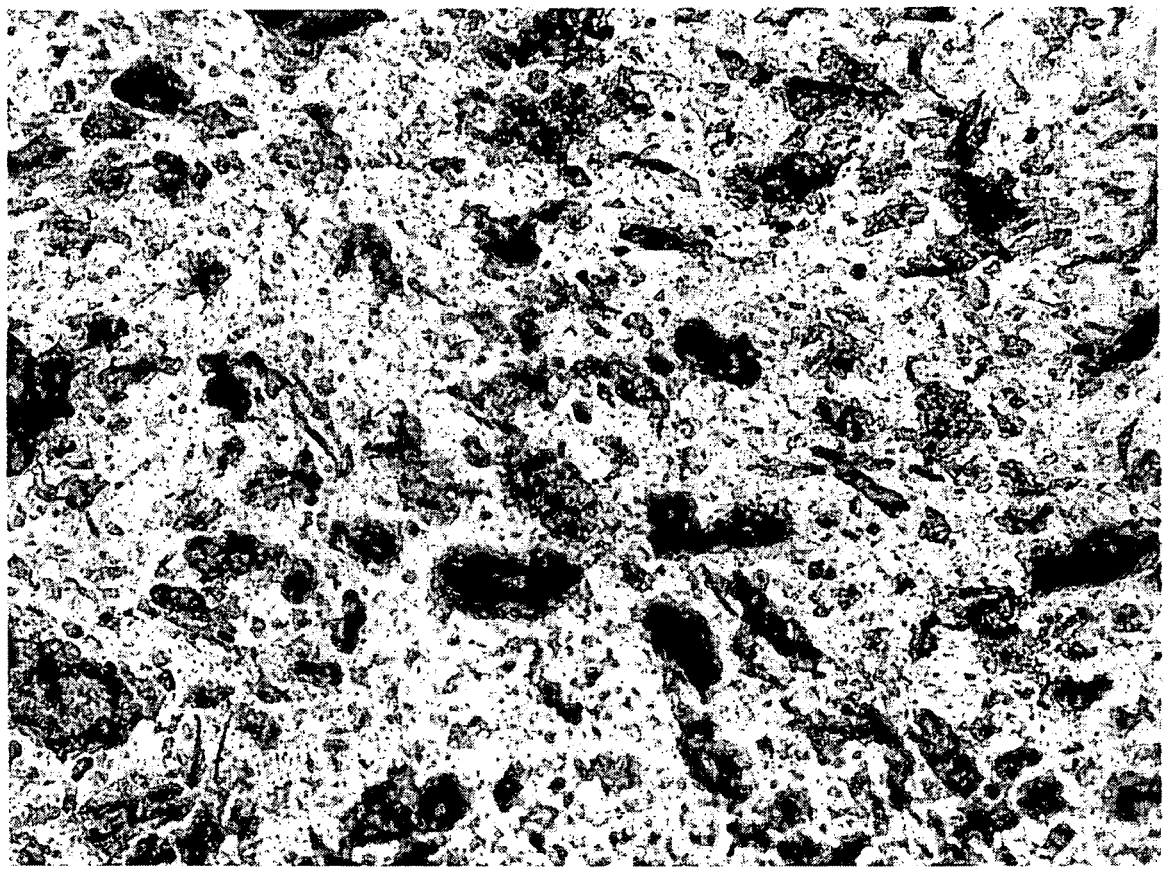
FIG. 2 is an optical photomicrograph (magnification: ×50) of the surface of the polymer electrolyte membrane produced in Comparative Example 2.

32 g of the above-obtained blend solution was poured into a stainless steel laboratory dish having a diameter of 15.4 cm, thereby forming a liquid coating in the laboratory dish. The liquid coating contained in the laboratory dish was dried for 2 hours in an oven maintained at 100° C., thereby forming a membrane in the laboratory dish. Then, the temperature of the oven was elevated to 150° C., and the formed membrane was subjected to heat treatment at 150° C. for 6 hours. The laboratory dish was taken out from the oven and allowed to cool and, then, an ion exchanged water was poured into the laboratory dish, to thereby peel off the membrane from the laboratory dish. The thus obtained membrane was sandwiched between filter papers to dry the membrane, and the dried membrane was used as a polymer electrolyte membrane. FIG. 2 is an optical photomicrograph (magnification: ×50) showing the surface of the obtained polymer electrolyte membrane. As shown in FIG. 2, many large agglomerates were observed in the surface of the polymer electrolyte membrane. The membrane was not only turbid in yellowish brown color, but also uneven in the color, i.e., the distribution of PBI was non-uniform. The membrane had a haze value of 76.5% ($H_{50}$=77.2%). Further, when a cross-section of the polymer electrolyte membrane which was taken in a thicknesswise direction of the membrane was examined with respect to a 15 μm×15 μm area thereof through a TEM, no sea/islands structure was observed.

The polymer electrolyte membrane was subjected to the OCV accelerated test. In the case where the cell temperature was 100° C., no pinhole occurred for more than 200 hours. However, in the case where the cell temperature was 120° C., the hydrogen permeability increased drastically (i.e., a pinhole occurred) 70 hours after the start of the test, and hence the test was terminated. In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.00 A/cm² as measured under conditions wherein the cell temperature was 80° C. and the voltage was 0.6 V. However, when the durability of the polymer electrolyte membrane in the MEA was evaluated, it was found that the durability of the polymer electrolyte membrane in the MEA was unsatisfactory. Specifically, in the case where the cell temperature was 100° C., the occurrence of a cross-leak increased drastically 140 hours after the start of the test, and hence the test was terminated. In the case where the cell temperature was 110° C., the occurrence of a cross-leak increased drastically 280 hours after the start of the test, and hence the test was terminated. As apparent from the above, although the polymer electrolyte membrane had excellent nitial property, its durability was unsatisfactory.

Comparative Example 3

A polymer electrolyte membrane having a Nafion/PBI weight ratio of 66.7/33.3, an ion exchange capacity of 0.60 milliequivalent/g and a thickness of 53 μm was produced by the method described in Comparative Example 3 of KR 2003-32321 A, as follows.

To 10 g of a 10% by weight PBI/DMAC solution prepared in the same manner as in Comparative Example 2 was added 20 g of a 10% by weight Nafion/DMAC solution prepared in the same manner as in Comparative Example 2, followed by vigorous stirring at 120° C. for 6 hours, thereby obtaining a Nafion/PBI/DMAC blend solution.

Figure 3:
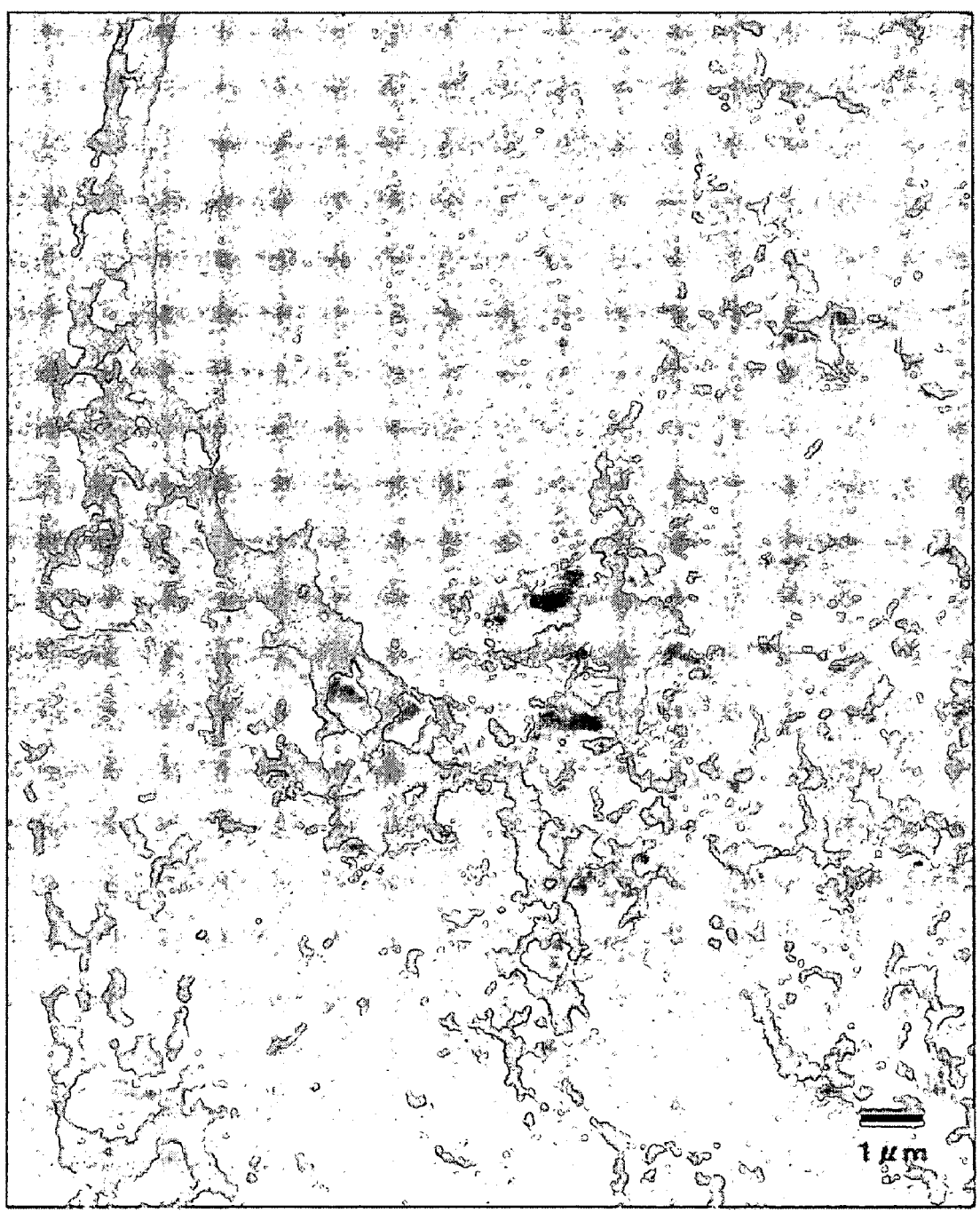
FIG. 3 is a TEM photomicrograph of a cross-section of the polymer electrolyte membrane produced in Comparative Example 3, which was taken in a thicknesswise direction thereof.

32 g of the above-obtained blend solution was poured into a stainless steel laboratory dish having a diameter of 15.4 cm, thereby forming a liquid coating in the laboratory dish. The liquid coating contained in the laboratory dish was dried for 2 hours in an oven maintained at 100° C., thereby forming a membrane in the laboratory dish. Then, the temperature of the oven was elevated to 150° C., and the formed membrane was subjected to heat treatment at 150° C. for 6 hours. The laboratory dish was taken out from the oven and allowed to cool and, then, an ion exchanged water was poured into the laboratory dish, to thereby peel off the membrane from the laboratory dish. The thus obtained membrane was sandwiched between filter papers to dry the membrane, and the dried membrane was used as a polymer electrolyte membrane. The membrane was not only turbid in yellowish brown color, but also uneven in the color, i.e., the distribution of PBI was non-uniform. The membrane had a haze value of 76.5% ($H_{50}$=74.5%). Further, when a cross-section of the polymer electrolyte membrane which was taken in a thicknesswise direction of the membrane was examined with respect to a 15 μm×15 μm area thereof through a TEM, as seen in FIG. 3, no sea/islands structure was observed, and a large number of cracks were observed.

The polymer electrolyte membrane was subjected to the OCV accelerated test. In the case where the cell temperature was 100° C., no pinhole occurred for more than 200 hours. However, in the case where the cell temperature was 120° C., the hydrogen permeability increased drastically (i.e., a pinhole occurred) 70 hours after the start of the test, and hence the test was terminated. In addition, it was attempted to evaluate the fuel cell properties of the polymer electrolyte membrane with respect to a membrane/electrode assembly (MEA) produced using the polymer electrolyte membrane. However, power generation was impossible at any of cell temperatures of 80° C., 100° C. and 110° C.

Results of Example 1 and Comparative Examples 1 to 3 are shown in Table 1.

TABLE 1

| | Properties of membrane | | | | | | Evaluation of fuel cell properties | | |
|---|---|---|---|---|---|---|---|---|---|
| | | Ion exchange | | | Thick- | OCV accelerated | | Initial | Evaluation of |
| | Basic | capacity | | | ness of | test | | property | durability |
| | polymer % by weight | Milli- equivalent | Haze % | $H_{50}$ % | membrane μm | 100° C. | 120° C. | A/cm² | 100° C. | 110° C. |
| Ex. 1 | 2.5 | 0.77 | 0.6 | 0.6 | 50 | ○ (>200 hr) | ○ (>100 hr) | 1.00 | ○ (>300 hr) | ○ (>480 hr) |
| Comp. Ex. 1 | 0.0 | 0.91 | 0.5 | 0.5 | 51 | x (<40 hr) | x (<20 hr) | 1.10 | x (<140 hr) | x (<140 hr) |
| Comp. Ex. 2 | 2.5 | 0.85 | 76.5 | 77.2 | 49 | ○ (>200 hr) | x (<70 hr) | 1.00 | x (<140 hr) | x (<280 hr) |
| Comp. Ex. 3 | 33.0 | 0.60 | 76.5 | 74.5 | 53 | ○ (>200 hr) | x (<70 hr) | Power generation was impossible | Power generation was impossible | Power generation was impossible |

Example 2

A polymer electrolyte membrane having a PFS/PBI weight ratio of 99.0/1.0, an ion exchange capacity of 1.25 milliequivalents/g and a thickness of 49 μm was produced as follows, using as a fluorinated polymer electrolyte, a perfluorosulfonic acid polymer (hereinafter referred to as "PFS") represented by the following formula:

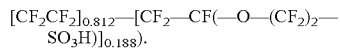

$[CF_2CF_2]_{0.812}$—$[CF_2$—$CF($—$O$—$(CF_2)_2$—$SO_3H)]_{0.188}$.

A perfluorocarbon polymer (MI: 3.0) of tetra-fluoroethylene and $CF_2$=$CFO(CF_2)_2$—$SO_2F$ was produced as a precursor polymer for PFS. The produced precursor polymer was added to an aqueous solution of potassium hydroxide (15% by weight) and dimethylsulfoxide (30% by weight), and the precursor polymer was contacted with the aqueous solution at 60° C. for 4 hours, thereby performing a hydrolysis treatment. Then, the precursor polymer was immersed in water having a temperature of 60° C. for 4 hours. Subsequently, the precursor polymer was immersed in an aqueous 2N hydrochloric acid solution having a temperature of 60° C. for 3 hours, followed by washing with ion exchanged water and drying, thereby obtaining a PFS having an ion exchange capacity of 1.41 milliequivalents/g.

An aqueous ethanol solution (water/ethanol=50.0/50.0 (weight ratio)) was charged into an autoclave together with the above-obtained PFS. After sealing the autoclave, the temperature of the autoclave was elevated to 180° C. and maintained at 180° C. for 5 hours. Then, the autoclave was allowed to cool to room temperature, thereby obtaining a polymer solution having a PFS/water/ethanol weight ratio of 5.0/47.5/47.5. The obtained polymer solution was subjected to vacuum concentration, followed by addition of water, thereby obtaining preliminary solution C2 having a PFS/water weight ratio of 8.5/91.5.

On the other hand, DMAC was added to preliminary solution C2 which was prepared in the same manner as described above, and the resultant mixture was refluxed at 120° C. for 1 hour, followed by vacuum concentration by means of an evaporator, thereby obtaining preliminary solution B2 having a PFS/DMAC weight ratio of 1.5/98.5.

Next, 6.5 g of the same preliminary solution A1 as used in Example 1 was added to 40.0 g of preliminary solution B2, followed by stirring. To the resultant was added 68.9 g of preliminary solution C2, followed by stirring. The resultant mixture was subjected to vacuum concentration at 80° C., thereby obtaining a casting liquid. The obtained casting liquid had a PFS concentration of 5.600% by weight and a PBI concentration of 0.056% by weight.

Figure 4:
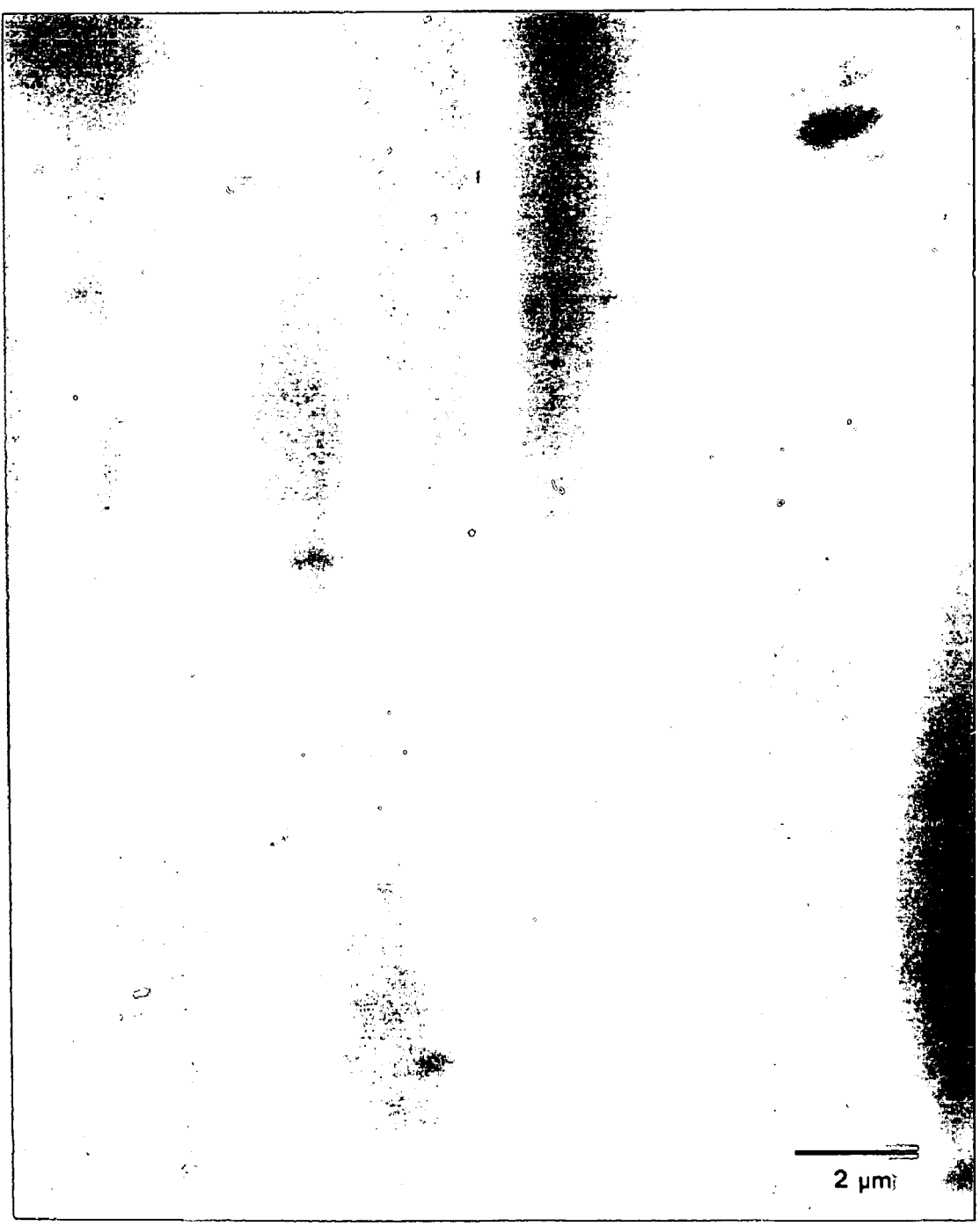
FIG. 4 is a TEM photomicrograph of a cross-section of the polymer electrolyte membrane produced in Example 2, which was taken in a thicknesswise direction thereof.

Using the casting liquid, the polymer electrolyte membrane of the present invention was produced in the same manner as in Example 1. The produced membrane was uniformly pale yellow but had high transparency. The haze value of the membrane was 3.0% ($H_{50}$=3.1%). Further, a cross-section of the polymer electrolyte membrane which was taken in a thicknesswise direction of the membrane was examined with respect to a 15 μm×15 μm area thereof through a TEM. As shown in FIG. 4, a sea/islands structure was observed. The ratio of the island particles in the sea/islands structure was 2.3%, in terms of the percentage of the total area of the island particles in the 15 μm×15 μm area of the cross-section, and the density of the island particles in the sea/islands structure was 0.5 island particle/μm² in the 15 μm×15 μm area of the cross-section.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.30 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 3

Using the same fluorinated polymer electrolyte (namely PFS) and same preliminary solutions A1, B2 and C2 as used in Example 2, a polymer electrolyte membrane having a PFS/PBI weight ratio of 98.1/1.9, an ion exchange capacity of 1.14 milliequivalents/g and a thickness of 51 μm was produced as follows.

6.5 g of preliminary solution A1 was added to 40.0 g of preliminary solution B2, followed by stirring. To the resultant was added 32.4 g of preliminary solution C2, followed by stirring. The resultant mixture was subjected to vacuum concentration at 80° C., thereby obtaining a casting liquid. The obtained casting liquid had a PFS concentration of 5.6% by weight and a PBI concentration of 0.11% by weight.

Figure 5:
FIG. 5 is a TEM photomicrograph of a cross-section of the polymer electrolyte membrane produced in Example 3, which was taken in a thicknesswise direction thereof.

Using the casting liquid, the polymer electrolyte membrane of the present invention was produced in the same manner as in Example 2. The produced membrane was uniformly pale yellow but had high transparency. The haze value of the membrane was 3.2% ($H_{50}$=3.1%). Further, a cross-section of the polymer electrolyte membrane which was taken in a thicknesswise direction of the membrane was examined with respect to a 15 μm×15 μm area thereof through a TEM. As shown in FIG. 5, a sea/islands structure was observed. The ratio of the island particles in the sea/islands structure was 11.6%, in terms of the percentage of the total area of the island particles in the 15 μm×15 μm area of the cross-section, and the density of the island particles in the sea/islands structure was 2.9 island particles/$\mu^2$ in the 15 μm×15 μm area of the cross-section.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.25 A/cm$^2$ as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 4

Using the same fluorinated polymer electrolyte (namely PFS) and same preliminary solutions A1, B2 and C2 as used in Example 2, a polymer electrolyte membrane having a PFS/PBI weight ratio of 97.5/2.5, an ion exchange capacity of 1.10 milliequivalents/g and a thickness of 52 μm was produced as follows.

6.5 g of preliminary solution A1 was added to 40.0 g of preliminary solution B2, followed by stirring. To the resultant was added 22.8 g of preliminary solution C2, followed by stirring. The resultant mixture was subjected to vacuum concentration at 80° C., thereby obtaining a casting liquid. The obtained casting liquid had a PFS concentration of 5.6% by weight and a PBI concentration of 0.14% by weight.

Using the casting liquid, the polymer electrolyte membrane of the present invention was produced in the same manner as in Example 2. The produced membrane was uniformly pale yellow but had high transparency. The haze value of the membrane was 3.5% ($H_{50}$=3.4%). Further, a cross-section of the polymer electrolyte membrane which was taken in a thicknesswise direction of the membrane was examined with respect to a 15 μm×15 μm area thereof through a TEM. As shown in FIG. 6(a), a sea/islands structure was observed. The ratio of the island particles in the sea/islands structure was 23.5%, in terms of the percentage of the total area of the island particles in the 15 μm×15 μm area of the cross-section, and the density of the island particles in the sea/islands structure was 14.5 island particles/$\mu m^2$ in the 15 μm×15 μm area of the cross-section.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.20 A/cm$^2$ as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 5

Using the same fluorinated polymer electrolyte (namely PFS) and same preliminary solutions A1, B2 and C2 as used in Example 2, a polymer electrolyte membrane having a PFS/PBI weight ratio of 96.5/3.5, an ion exchange capacity of 1.05 milliequivalents/g and a thickness of 49 μm was produced as follows.

6.5 g of preliminary solution A1 was added to 40.0 g of preliminary solution B2, followed by stirring. To the resultant was added 14.0 g of preliminary solution C2, followed by stirring. The resultant mixture was subjected to vacuum concentration at 80° C., thereby obtaining a casting liquid. The obtained casting liquid had a PFS concentration of 5.6% by weight and a PBI concentration of 0.20% by weight.

Using the casting liquid, the polymer electrolyte membrane of the present invention was produced in the same manner as in Example 2. The produced membrane was uniformly pale yellow but had high transparency. The haze value of the membrane was 3.8% ($H_{50}$=3.9%). Further, a cross-section of the polymer electrolyte membrane which was taken in a thicknesswise direction of the membrane was examined with respect to a 15 μm×15 μm area thereof through a TEM. As shown in FIG. 7, a sea/islands structure was observed. The ratio of the island particles in the sea/islands structure was 22.3%, in term of the percentage of the total area of the island particles in the 15 μm×15 μm area of the cross-section, and the density of the island particles in the sea/islands structure was 22.2 island particles/m² in the 15 µm×15 µm area of the cross-section.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.20 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 6

Using the same fluorinated polymer electrolyte (namely PFS) and same preliminary solutions A1, B2 and C2 as used in Example 2, a polymer electrolyte membrane having a PFS/PBI weight ratio of 94.8/5.2, an ion exchange capacity of 0.91 milliequivalent/g and a thickness of 53 µm was produced as follows.

6.5 g of preliminary solution A1 was added to 40.0 g of preliminary solution B2, followed by stirring. To the resultant was added 6.9 g of preliminary solution C2, followed by stirring. The resultant mixture was subjected to vacuum concentration at 80° C., thereby obtaining a casting liquid. The obtained casting liquid had a PFS concentration of 5.6% by weight and a PBI concentration of 0.31% by weight.

Using the casting liquid, the polymer electrolyte membrane of the present invention was produced in the same manner as in Example 2. The produced membrane was uniformly pale yellow but had high transparency. The haze value of the membrane was 5.5% ($H_{50}$=5.2%). Further, a cross-section of the polymer electrolyte membrane which was taken in a thicknesswise direction of the membrane was examined with respect to a 15 µm×15 µm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited an electric current density of 0.800 A/cm² as measured under conditions wherein the cell temperature was 80° C. and the voltage was 0.6 V, that is, the electric current density was lower than those of the membranes obtained in Examples 2 to 5. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, although the polymer electrolyte membrane exhibited an initial property which was lower than those of the membranes of Examples 2 to 5, the polymer electrolyte membrane exhibited excellent durability.

Example 7

Using the same casting liquid as used in Example 2, a polymer electrolyte membrane having a PFS/PBI weight ratio of 99.0/1.0, an ion exchange capacity of 1.25 milliequivalents/g and a thickness of 25 µm was produced. The produced membrane was uniformly pale yellow but had high transparency. The haze value of the membrane was 2.9% ($H_{50}$=5.7%). Further, a cross-section of the polymer electrolyte membrane which was taken in a thicknesswise direction of the membrane was examined with respect to a 15 µm×15 µm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.40 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 300 hours when the cell temperature was 100° C., and no pinhole occurred for more than 300 hours when the cell temperature was 110° C. As apparent from the above, the polymer electrolyte membrane exhibited excellent properties with respect to both durability and initial property.

Example 8

Using the same casting liquid as used in Example 2, a polymer electrolyte membrane having a PFS/PBI weight ratio of 99.0/1.0, an ion exchange capacity of 1.25 milliequivalents/g and a thickness of 69 µm was produced. The produced membrane was uniformly pale yellow but had high transparency. The haze value of the membrane was 9.9% ($H_{50}$=7.3%). Further, a cross-section of the polymer electrolyte membrane which was taken in a thicknesswise direction of the membrane was examined with respect to a 15 µm×15 µm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.30 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 9

Using the same casting liquid as used in Example 2, a polymer electrolyte membrane having a PFS/PBI weight ratio of 99.0/1.0, an ion exchange capacity of 1.25 milliequivalents/g and a thickness of 95 μm was produced. The produced membrane was uniformly pale yellow but had high transparency. The haze value of the membrane was 10.5% ($H_{50}$=5.7%). Further, a cross-section of the polymer electrolyte membrane which was taken in a thicknesswise direction of the membrane was examined with respect to a 15 μm×15 μm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.20 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 10

Using the same casting liquid as used in Example 2, a polymer electrolyte membrane having a PFS/PBI weight ratio of 99.0/1.0, an ion exchange capacity of 1.25 milliequivalents/g and a thickness of 105 μm was produced. The produced membrane was uniformly pale yellow but had high transparency. The haze value of the membrane was 10.5% ($H_{50}$=5.1%). Further, a cross-section of the polymer electrolyte membrane which was taken in a thicknesswise direction of the membrane was examined with respect to a 15 μm×15 μm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited an electric current density of 1.00 A/cm² as measured under conditions wherein the cell temperature was 80° C. and the voltage was 0.6 V, that is, the electric current density was slightly lower than those of the membranes of Examples 7 to 9. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Example 11

Using the same casting liquid as used in Example 2, a polymer electrolyte membrane having a PFS/PBI weight ratio of 99.0/1.0, an ion exchange capacity of 1.25 milliequivalents/g and a thickness of 152 μm was produced. The produced membrane was uniformly pale yellow but had high transparency. The haze value of the membrane was 13.0% ($H_{50}$=4.5%). Further, a cross-section of the polymer electrolyte membrane which was taken in a thicknesswise direction of the membrane was examined with respect to a 15 μm×15 μm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited an electric current density of 0.70 A/cm² as measured under conditions wherein the cell temperature was 80° C. and the voltage was 0.6 V, that is, the electric current density was considerably lower than those of the membranes obtained in Examples 7 to 10. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, although the polymer electrolyte membrane exhibited a poor initial property, the polymer electrolyte membrane exhibited excellent durability.

Example 12

Using the same casting liquid as used in Example 6, a polymer electrolyte membrane having a PFS/PBI weight ratio of 94.8/5.2, an ion exchange capacity of 0.91 milliequivalent/g and a thickness of 25 μm was produced. The produced membrane was uniformly pale yellow but had high transparency. The haze value of the membrane was 5.2% ($H_{50}$=10.1%). Further, a cross-section of the polymer electrolyte membrane which was taken in a thicknesswise direction of the membrane was examined with respect to a 15 μm×15 μm area thereof through a TEM. A sea/islands structure similar to those of the membranes obtained in Examples 2 to 5 was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.10 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 500 hours when the cell temperature was 100° C., and no pinhole occurred for more than 500 hours when the cell temperature was 110° C. As apparent from the above, the polymer electrolyte membrane exhibited excellent properties with respect to both durability and initial property.

Comparative Example 4

Using the same preliminary solution C2 as used in Example 2, a polymer electrolyte membrane having an ion exchange capacity of 1.41 milliequivalents/g and a thickness of 53 μm was produced as follows.

32.0 g of preliminary solution C2 was poured into a laboratory dish having a diameter of 15.4 cm, thereby forming a liquid coating in the laboratory dish. The laboratory dish containing the liquid coating was heated on a hot plate at 60° C. for 1 hour, followed by further heating at 80° C. for 1 hour, to remove the solvent from the liquid coating, thereby forming a membrane in the laboratory dish. Then, the laboratory dish was placed in an oven, and the formed membrane was subjected to heat treatment at 160° C. for 1 hour. The laboratory dish was taken out from the oven and allowed to cool and, then, an ion exchanged water was poured into the laboratory dish, to thereby peel off the membrane from the laboratory dish. The thus obtained membrane was sandwiched between filter papers to dry the membrane, and the dried membrane was used as a polymer electrolyte membrane. The obtained membrane was transparent and had a haze value of 0.6% ($H_{50}$=0.6%). Further, when a cross-section of the polymer electrolyte membrane which was taken in a thicknesswise direction of the membrane was examined with respect to a 15 μm×15 μm area thereof through a TEM, no sea/islands structure was observed.

The polymer electrolyte membrane was subjected to the OCV accelerated test. However, in the case where the cell temperature was 100° C., the hydrogen permeability increased drastically (i.e., a pinhole occurred) 40 hours after the start of the test, and hence the test was terminated. In the case where the cell temperature was 120° C., the hydrogen permeability increased drastically (i.e., a pinhole occurred) 20 hours after the start of the test, and hence the test was terminated. In addition, the fuel cell properties of the polymer electrolyte membrane were evaluated with respect to a membrane/electrode assembly (MEA) produced using the polymer electrolyte membrane. The polymer electrolyte membrane in the MEA exhibited extremely excellent initial property, namely an electric current density of 1.35 A/cm² as measured under conditions wherein the cell temperature was 80° C. and the voltage was 0.6 V. However, when the durability of the polymer electrolyte membrane in the MEA was evaluated, it was found that the durability of the polymer electrolyte membrane in the MEA was unsatisfactory. Specifically, in both of the case where the cell temperature was 100° C. and the case where the cell temperature was 110° C., the occurrence of a cross-leak increased drastically 140 hours after the start of the test, and hence the test was terminated. As apparent from the above, although the polymer electrolyte membrane had excellent initial property, its durability was unsatisfactory.

Results of Examples 2 to 12 and Comparative Example 4 are shown in Table 2.

TABLE 2

| | Properties of membrane | | | | | Evaluation of fuel cell properties | | | | |
|---|---|---|---|---|---|---|---|---|---|---|
| | Basic polymer % by weight | Ion exchange capacity Milli- equivalent | Haze % | $H_{50}$ % | Thickness of membrane μm | OCV accelerated test | | Initial property A/cm² | Evaluation of durability | |
| | | | | | | 100° C. | 120° C. | | 100° C. | 110° C. |
| Ex. 2 | 1.0 | 1.25 | 3.0 | 3.1 | 49 | ○ (>200 hr) | ○ (>100 hr) | 1.30 | ○ (>500 hr) | ○ (>500 hr) |
| Ex. 3 | 1.9 | 1.14 | 3.2 | 3.1 | 51 | ○ (>200 hr) | ○ (>100 hr) | 1.25 | ○ (>500 hr) | ○ (>500 hr) |
| Ex. 4 | 2.5 | 1.10 | 3.5 | 3.4 | 52 | ○ (>200 hr) | ○ (>100 hr) | 1.20 | ○ (>500 hr) | ○ (>500 hr) |
| Ex. 5 | 3.5 | 1.05 | 3.8 | 3.9 | 49 | ○ (>200 hr) | ○ (>100 hr) | 1.20 | ○ (>500 hr) | ○ (>500 hr) |
| Ex. 6 | 5.2 | 0.91 | 5.5 | 5.2 | 53 | ○ (>200 hr) | ○ (>100 hr) | 0.80 | ○ (>500 hr) | ○ (>500 hr) |
| Ex. 7 | 1.0 | 1.25 | 2.9 | 5.7 | 25 | ○ (>200 hr) | ○ (>100 hr) | 1.40 | ○ (>300 hr) | ○ (>300 hr) |

TABLE 2-continued

| | Properties of membrane | | | | | | Evaluation of fuel cell properties | | |
|---|---|---|---|---|---|---|---|---|---|
| | Basic polymer % by weight | Ion exchange capacity Milliequivalent | Haze % | $H_{50}$ % | Thickness of membrane μm | OCV accelerated test | | Initial property A/cm² | Evaluation of durability | |
| | | | | | | 100° C. | 120° C. | | 100° C. | 110° C. |
| Ex. 8 | 1.0 | 1.25 | 9.9 | 7.3 | 69 | ○ (>200 hr) | ○ (>100 hr) | 1.30 | ○ (>500 hr) | ○ (>500 hr) |
| Ex. 9 | 1.0 | 1.25 | 10.5 | 5.7 | 95 | ○ (>200 hr) | ○ (>100 hr) | 1.20 | ○ (>500 hr) | ○ (>500 hr) |
| Ex. 10 | 1.0 | 1.25 | 10.5 | 5.1 | 105 | ○ (>200 hr) | ○ (>100 hr) | 1.00 | ○ (>500 hr) | ○ (>500 hr) |
| Ex. 11 | 1.0 | 1.25 | 13.0 | 4.5 | 152 | ○ (>200 hr) | ○ (>100 hr) | 0.70 | ○ (>500 hr) | ○ (>500 hr) |
| Ex. 12 | 5.2 | 0.91 | 5.2 | 10.1 | 25 | ○ (>200 hr) | ○ (>100 hr) | 1.10 | ○ (>500 hr) | ○ (>500 hr) |
| Comp. Ex. 4 | 0.0 | 1.41 | 0.6 | 0.6 | 53.0 | x (<40 hr) | x (<20 hr) | 1.35 | x (<140 hr) | x (<140 hr) |

Example 13

In this Example 13, polyaniline was used as a basic polymer. A polymer electrolyte membrane having a PFS/polyaniline weight ratio of 99.0/1.0, an ion exchange capacity of 1.21 milliequivalents/g and a thickness of 50 μm was produced as follows.

Polyaniline (manufactured and sold by POLYSCIENCES Inc., U.S.A.) was charged into an autoclave together with DMAC. After sealing the autoclave, the temperature of the autoclave was elevated to 150° C. and maintained at 150° C. for 5 hours. Then, the autoclave was allowed to cool to room temperature, thereby obtaining preliminary solution A2 having a polyaniline/DMAC weight ratio of 1/99. Then, a casting liquid was produced as described below using the obtained preliminary solution A2 and the same preliminary solutions B2 and C2 as used in Example 2.

6.5 g of preliminary solution A2 was added to 40.0 g of preliminary solution B2, followed by stirring. To the resultant was added 68.9 g of preliminary solution C2, followed by stirring. The resultant mixture was subjected to vacuum concentration at 80° C., thereby obtaining a casting liquid. The obtained casting liquid had a PFS concentration of 5.600% by weight and a polyaniline concentration of 0.056% by weight.

Using the casting liquid, the polymer electrolyte membrane of the present invention was produced in the same manner as in Example 1. The membrane had high transparency. The haze value of the membrane was 3.0% ($H_{50}$=3.1%). Further, when a cross-section of the polymer electrolyte membrane which was taken in a thicknesswise direction of the membrane was examined with respect to a 15 μm×15 μm area thereof through a TEM, a sea/islands structure was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.00 A/cm² as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 300 hours when the cell temperature was 100° C., and no pinhole occurred for more than 480 hours when the cell temperature was 110° C. As apparent from the above, the polymer electrolyte membrane exhibited excellent properties with respect to both durability and initial property.

Example 14

In this Example 14, polyvinylpyridine was used as a basic polymer. A polymer electrolyte membrane having a PFS/polyvinylpyridine weight ratio of 99.0/1.0, an ion exchange capacity of 1.21 milliequivalents/g and a thickness of 50 μm was produced as follows.

Polyvinylpyridine (manufactured and sold by Sigma-Aldrich Corporation, Japan) was charged into an autoclave together with DMAC. After sealing the autoclave, the temperature of the autoclave was elevated to 150° C. and maintained at 150° C. for 5 hours. Then, the autoclave was allowed to cool to room temperature, thereby obtaining preliminary solution A3 having a polyvinylpyridine/DMAC weight ratio of 1/99. Then, a casting liquid was produced as described below using the obtained preliminary solution A3 and the same preliminary solutions B2 and C2 as used in Example 2.

6.5 g of preliminary solution A3 was added to 40.0 g of preliminary solution B2, followed by stirring. To the resultant was added 68.9 g of preliminary solution C2, followed by stirring. The resultant mixture was subjected to vacuum concentration at 80° C., thereby obtaining a casting liquid. The obtained casting liquid had a PFS concentration of 5.600% by weight and a polyvinylpyridine concentration of 0.056% by weight.

Using the casting liquid, the polymer electrolyte membrane of the present invention was produced in the same manner as in Example 1. The membrane had high transparency. The haze value of the membrane was 3.0% ($H_{50}$=3.1%). Further, when a cross-section of the polymer electrolyte membrane which was taken in a thicknesswise direction of the membrane was examined with respect to a 15 μm×15 μm area thereof through a TEM, a sea/islands structure was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.00 A/cm$^2$ as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 300 hours when the cell temperature was 100° C., and no pinhole occurred for more than 480 hours when the cell temperature was 110° C. As apparent from the above, the polymer electrolyte membrane exhibited excellent properties with respect to both durability and initial property.

Example 15

In this Example 15, polyethylene imine was used as a basic polymer. A polymer electrolyte membrane having a PFS/polyethylene imine weight ratio of 99.0/1.0, an ion exchange capacity of 1.21 milliequivalents/g and a thickness of 50 μm was produced as follows.

A 30% by weight aqueous polyethylene imine solution (P-70, manufactured and sold by Wako Pure Chemical Industries, Ltd., Japan) was used as preliminary solution A4. A casting solution was prepared as described below using preliminary solution A4 and the same preliminary solutions B2 and C2 as used in Example 2.

0.07 g of preliminary solution A4 was added to 12.00 g of preliminary solution B2, followed by stirring. To the resultant was added 21.20 g of preliminary solution C2, followed by stirring. The resultant mixture was subjected to vacuum concentration at 80° C., thereby obtaining a casting liquid. The obtained casting liquid had a PFS concentration of 5.6% by weight and a polyethylene imine concentration of 0.056% by weight.

Using the casting liquid, the polymer electrolyte membrane of the present invention was produced in the same manner as in Example 1. The membrane had high transparency. The haze value of the membrane was 3.0% (H$_{50}$=3.1%). Further, when a cross-section of the polymer electrolyte membrane which was taken in a thicknesswise direction of the membrane was examined with respect to a 15 μm×15 μm area thereof through a TEM, a sea/islands structure was observed.

The polymer electrolyte membrane was subjected to the OCV accelerated test. As a result, the polymer electrolyte membrane exhibited high durability, namely no pinhole occurred for more than 200 hours when the cell temperature was 100° C., and no pinhole occurred for more than 100 hours when the cell temperature was 120° C.

In addition, the fuel cell properties of the polymer electrolyte membrane were evaluated with respect to a membrane/electrode assembly (MEA) produced using the polymer electrolyte membrane. The polymer electrolyte membrane in the MEA exhibited excellent initial property, namely an electric current density of 1.00 A/cm$^2$ as measured under conditions wherein the cell temperature was 80° C. and the voltage was 0.6 V. The durability of the polymer electrolyte membrane in the MEA was also evaluated and it was found that the polymer electrolyte membrane in the MEA had high durability, namely no pinhole occurred for more than 300 hours when the cell temperature was 100° C., and no pinhole occurred for more than 480 hours when the cell temperature was 110° C. As apparent from the above, the polymer electrolyte membrane exhibited excellent properties with respect to both durability and initial property.

Example 16

Using the same fluorinated polymer electrolyte (PFS) as used in Example 2, a polymer electrolyte membrane having a PFS/PBI weight ratio of 99/1, an ion exchange capacity of 1.14 milliequivalents/g and a thickness of 50 μm was produced as follows.

PFS was charged into an autoclave together with DMAC. After sealing the autoclave, the temperature of the autoclave was elevated to 180° C. and maintained at 180° C. for 5 hours. Then, the autoclave was allowed to cool to room temperature, thereby obtaining preliminary solution B3 having a PFS/DMAC weight ratio of 1.5/98.5.

PFS was charged into an autoclave together with an aqueous isopropanol solution (water/isopropanol weight ratio=31.0/30.0). After sealing the autoclave, the temperature of the autoclave was elevated to 180° C. and maintained at 180° C. for 5 hours. Then, the autoclave was allowed to cool to room temperature, thereby obtaining preliminary solution C3 having a PFS/water/isopropanol weight ratio of 8.5/46.5/45.0.

Next, 0.65 g of preliminary solution A1 was gradually added to 4.00 g of preliminary solution B3 while stirring, thereby obtaining a uniform polymer solution. To the obtained polymer solution was gradually added 6.88 g of preliminary solution C3 while stirring, thereby obtaining a uniform casting solution.

The above-obtained casting liquid was poured into a stainless steel laboratory dish having a diameter of 9.1 cm, thereby forming a liquid coating in the laboratory dish. The laboratory dish containing the liquid coating was placed in an oven, and the temperature of the oven was elevated to 160° C. and maintained at 160° C. for 8 hours, to remove the solvent from the liquid coating, thereby forming a polymer electrolyte membrane in the laboratory dish. The laboratory dish was taken out from the oven and allowed to cool and, then, an ion exchanged water was poured into the laboratory dish, to thereby peel off the polymer electrolyte membrane from the laboratory dish. The thus obtained polymer electrolyte membrane was sandwiched between filter papers to dry the membrane, and the dried membrane was used as the polymer electrolyte membrane of the present invention. The membrane was uniformly pale yellow.

The polymer electrolyte membrane was subjected to the OCV accelerated test at a cell temperature of 100° C., and a cross-leak was measured 100 hours after the start of the test. As a result, the polymer electrolyte membrane exhibited high durability, namely the cross-leak was as low as $2.7 \times 10^{-12}$ (cc*cm/cm$^2$/sec/Pa), which was the same as that of the intact polymer electrolyte membrane which was not subjected to the OCV accelerated test.

INDUSTRIAL APPLICABILITY

The polymer electrolyte membrane of the present invention has excellent properties with respect to chemical stability, mechanical strength and heat stability, and exhibits high durability even when used at high temperatures. A polymer electrolyte fuel cell employing the polymer electrolyte membrane of the present invention is advantageous in that, even when the polymer electrolyte fuel cell is operated for a long time under high temperature/low humidity conditions (corresponding to an operation temperature around 100° C. and a humidification with 60° C. water (wherein the humidification with 60° C. water corresponds to a relative humidity (RH) of 20%)), the polymer electrolyte membrane will not suffer a breakage (such as the occurrence of a pinhole) and, therefore, a cross-leak (i.e., mixing of a fuel and an oxidant due to a breakage of a polymer electrolyte membrane) will not occur, thereby enabling the fuel cell to be operated stably for a long time under stringent conditions.

The invention claimed is:

1. A polymer electrolyte membrane comprising a uniform (b)-in-(a) microdispersion structure-containing polymer mixture of:
   (a) 90.000 to 99.990% by weight, based on the total weight of components (a) and (b), of a fluorinated polymer electrolyte having an ion exchange group, and
   (b) 0.010 to 10.000% by weight, based on the total weight of components (a) and (b), of a basic polymer,
   wherein, optionally, at least a part of component (a) and at least a part of component (b) are chemically bonded to each other,
   said polymer electrolyte membrane exhibiting a sea/islands structure when a cross-section of said membrane which is taken in a thicknesswise direction of the membrane is examined with respect to a 15 μm×15 μm area thereof by a transmission electron microscope,
   said sea/islands structure having its sea phase and island phase which are, respectively, composed mainly of said fluorinated polymer electrolyte (a) and said basic polymer (b).

2. The polymer electrolyte membrane according to claim 1, which exhibits a haze value of 25% or less as measured in accordance with JIS K 7136, when it has a thickness of 50 μm.

3. The polymer electrolyte membrane according to claim 1, which has a thickness other than 50 μm and exhibits a calculated haze value ($H_{50}$) of 25% or less, wherein said calculated haze value ($H_{50}$) is defined as a haze value calculated on the assumption that the polymer electrolyte membrane has a thickness of 50 μm,
   said calculated haze value ($H_{50}$) being obtained by the following formula:

$$H_{50} = 100 \cdot \left\{ 1 - \left( \frac{100 - H_t}{100} \right)^{\frac{50}{t}} \right\}.$$

wherein t represents the thickness (μm) of the polymer electrolyte membrane, and $H_t$ represents the haze value of the polymer electrolyte membrane, as measured in accordance with JIS K 7136.

4. The polymer electrolyte membrane according to any one of claims 1, 2 and 3, wherein said island phase is comprised of island particles, and the ratio of the island particles in said sea/islands structure is from 0.1 to 70%, in terms of the percentage of the total area of the island particles in said 15 μm×15 μm area of the cross-section of said membrane.

5. The polymer electrolyte membrane according to claim 4, wherein the density of the island particles in said sea/islands structure is from 0.1 to 100 island particles/μm² in said 15 μm×15 μm area of the cross-section of said membrane.

6. The polymer electrolyte membrane according to any one of claims 1, 2 and 3, wherein the amount of said basic polymer (b) is from 0.100 to 5.000% by weight, based on the total weight of components (a) and (b).

7. The polymer electrolyte membrane according to any one of claims 1, 2 and 3, wherein said basic polymer (b) is a nitrogen-containing aromatic basic polymer.

8. The polymer electrolyte membrane according to claim 7, wherein said nitrogen-containing aromatic basic polymer is poly[2,2'-(m-phenylene)-5,5'-bibenzimidazole].

9. The polymer electrolyte membrane according to any one of claims 1, 2 and 3, which has an ion exchange capacity of from 1.0 to 1.5 milliequivalents per gram of said membrane.

10. The polymer electrolyte membrane according to any one of claims 1, 2 and 3, wherein said fluorinated polymer electrolyte (a) is represented by the following formula:

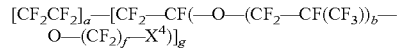

wherein 0≦a<1, 0<g≦1, a+g=1, 1≦b≦3, 1≦f≦8, and $X^4$ represents —COOH, —SO₃H, —PO₃H₂ or —PO₃H.

11. The polymer electrolyte membrane according to any one of claims 1, 2 and 3, wherein said fluorinated polymer electrolyte (a) is represented by the following formula:

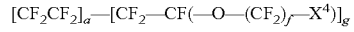

wherein 0≦a<1, 0<g≦1, a+g=1, 1≦f≦8, and $X^4$ represents —COOH, —SO₃H, —PO₃H₂ or —PO₃H.

12. The polymer electrolyte membrane according to any one of claims 1, 2 and 3, which has a thickness of from 2 to 150 μm.

13. The polymer electrolyte membrane according to any one of claims 1, 2 and 3, which has at least one reinforcement selected from the group consisting of a reinforcement contained in said membrane and a reinforcement secured to a surface of said membrane.

14. A membrane/electrode assembly comprising the polymer electrolyte membrane of any one of claims 1, 2 and 3, which is securely sandwiched between an anode and a cathode, wherein said anode comprises an anodic catalyst layer and is proton-conductive, and said cathode comprises a cathodic catalyst layer and is proton-conductive.

15. A polymer electrolyte fuel cell comprising the membrane/electrode assembly of claim 14, wherein said anode and said cathode are connected to each other through an electron conductive material which is positioned in the outside of said polymer electrolyte membrane.

* * * * *

UNITED STATES PATENT AND TRADEMARK OFFICE
CERTIFICATE OF CORRECTION

PATENT NO. : 7,875,392 B2
APPLICATION NO. : 10/874246
DATED : January 25, 2011
INVENTOR(S) : Naoto Miyake et al.

Page 1 of 1

It is certified that error appears in the above-identified patent and that said Letters Patent is hereby corrected as shown below:

Column 45, Line 49-51, In Claim 3, after " $H_{50} = 100 \cdot \left\{ 1 - \left( \frac{100 - H_t}{100} \right)^{\frac{50}{t}} \right\}$ " delete ".".

Signed and Sealed this
Twenty-sixth Day of April, 2011

David J. Kappos
*Director of the United States Patent and Trademark Office*